(12) United States Patent
Park et al.

(10) Patent No.: US 12,217,201 B2
(45) Date of Patent: *Feb. 4, 2025

(54) METHOD AND DEVICE FOR MANAGING PROJECT BY USING DATA POINTER

(71) Applicant: CROWDWORKS, INC., Seoul (KR)

(72) Inventors: Min Woo Park, Seongnam-si (KR); Jeong Sik Jang, Seongnam-si (KR); Jung Ho Park, Seoul (KR); Ji Won Choe, Seoul (KR)

(73) Assignee: CROWDWORKS, INC., Seoul (KR)

( * ) Notice: Subject to any disclaimer, the term of this patent is extended or adjusted under 35 U.S.C. 154(b) by 97 days.

This patent is subject to a terminal disclaimer.

(21) Appl. No.: 17/846,790

(22) Filed: Jun. 22, 2022

(65) Prior Publication Data
US 2022/0405678 A1 Dec. 22, 2022

(30) Foreign Application Priority Data

Jun. 22, 2021 (KR) .......................... 10-2021-0081192

(51) Int. Cl.
*G06Q 10/0631* (2023.01)
*G06Q 10/10* (2023.01)
*G06Q 10/0639* (2023.01)

(52) U.S. Cl.
CPC ..... *G06Q 10/06316* (2013.01); *G06Q 10/103* (2013.01); *G06Q 10/06395* (2013.01)

(58) Field of Classification Search
CPC ................. G06Q 10/103; G06Q 10/06; G06Q 10/063114; G06Q 10/0633; G06Q 10/06316; G06Q 10/06395; G06F 16/2379
USPC ........................................................ 705/7.26
See application file for complete search history.

(56) References Cited

U.S. PATENT DOCUMENTS

| | | | | |
|---|---|---|---|---|
| 8,738,414 B1* | 5/2014 | Nagar | ................. | G06Q 10/103 705/7.12 |
| 2012/0304187 A1* | 11/2012 | Maresh | .............. | G06Q 10/0631 718/103 |
| 2013/0086005 A1* | 4/2013 | Mori | ..................... | G06F 16/282 707/690 |
| 2013/0305258 A1* | 11/2013 | Durant | .................. | G06F 9/4881 718/106 |
| 2014/0298343 A1* | 10/2014 | Rajan | .................... | G06F 9/5027 718/102 |
| 2018/0196579 A1* | 7/2018 | Standefer, III | ... | G06Q 10/06311 |
| 2022/0014555 A1* | 1/2022 | Crabtree | .............. | G06Q 10/103 |

FOREIGN PATENT DOCUMENTS

| KR | 10-0459417 B1 | 12/2004 |
|---|---|---|
| KR | 10-2014-0095956 A | 8/2014 |
| KR | 10-2155889 B1 | 9/2020 |

OTHER PUBLICATIONS

Office Action issued in KR 10-2021-0081192; mailed by the Korean Intellectual Patent Office on Sep. 27, 2021.

* cited by examiner

*Primary Examiner* — Charles Guiliano
*Assistant Examiner* — Letoria G Knight
(74) *Attorney, Agent, or Firm* — Studebaker & Brackett PC

(57) ABSTRACT

Disclosed are a method and device for managing a project by using a data pointer. A project is efficiently operated by dividing a project based on a minimum unit task and designing a plurality of child projects connected in sequential order such that a plurality of child projects proceed in order.

13 Claims, 31 Drawing Sheets

FIG. 8

| Address | Data stored in memory |
|---|---|
| 0X11 | Result data in which CP1 of source data 1 is completed |
| 0X12 | XXX |
| 0X13 | XXX |
| ⋮ | ⋮ |

Result pointer of CP1 → 0X11
Source pointer of CP2 → 0X11

FIG. 13

| Address | Data stored in memory |
|---|---|
| 0X11 | XXX |
| 0X12 | Result data in which CP2 of source data 1 is completed |
| 0X13 | Result data in which CP3 of source data 1 is completed |
| ⋮ | ⋮ |

Result pointer of CP2 → 0X12
Source pointer of CP4 → 0X12
Result pointer of CP3 → 0X13

FIG. 14

Metadata of source data 1

| CP1 | | CP2 | | ... |
|---|---|---|---|---|
| Processing terminal ID | XXX | Processing terminal ID | XXX | |
| Source pointer value | XXX | Source pointer value | XXX | ... |
| Result pointer value | XXX | Result pointer value | XXX | |
| ⋮ | ⋮ | ⋮ | ⋮ | |

FIG. 17

Data attribute information before processing of CP1 is requested

| Final unit task ID | NULL |
|---|---|
| Processing status | NULL |
| Filtering status | False |
| Filter pass list | NULL |

FIG. 18

Data attribute information in section A

| Final unit task ID | CP1 |
|---|---|
| Processing status | Progress |
| Filtering status | False |
| Filter pass list | NULL |

FIG. 19

Data attribute information in section B

| Final unit task ID | CP1 |
|---|---|
| Processing status | Completion |
| Filtering status | False |
| Filter pass list | NULL |

⟹ Satisfy filtering target condition

FIG. 20A

Data attribute information in section C

| Final unit task ID | CP1 |
|---|---|
| Processing status | Completion |
| Filtering status | True |
| Filter pass list | Filter ID related to CP2 |

⟹ Request processing of CP2

FIG. 20B

Data attribute information in section C

| Final unit task ID | CP1 |
|---|---|
| Processing status | Completion |
| Filtering status | True |
| Filter pass list | NULL |

⟹ Not request processing of CP2

FIG. 21

Metadata of source data 1

| CP1 | | CP2 | | ... |
|---|---|---|---|---|
| Processing terminal ID | XXX | Processing terminal ID | XXX | |
| Processing status | XXX | Processing status | XXX | ... |
| Filtering status | XXX | Filtering status | XXX | |
| Filter pass list | XXX | Filter pass list | XXX | |
| ⋮ | ⋮ | ⋮ | ⋮ | |

FIG. 23

| Source data | Unit result ID | Child project | Result component ID |
|---|---|---|---|
| 1 | SD_1 | 1 | CP_1 |
| | | 2 | CP_2 |
| 2 | SD_2 | 1 | CP_1 |
| | | 2 | CP_2 |
| 3 | SD_3 | 1 | CP_1 |
| | | 2 | CP_2 |
| ... | ... | ... | ... |
| N | SD_N | 1 | CP_1 |
| | | 2 | CP_2 |

METHOD AND DEVICE FOR MANAGING PROJECT BY USING DATA POINTER

CROSS-REFERENCE TO RELATED APPLICATIONS

A claim for priority under 35 U.S.C. § 119 is made to Korean Patent Application No. 10-2021-0081192 filed on Jun. 22, 2021 in the Korean Intellectual Property Office, the entire contents of which are hereby incorporated by reference.

BACKGROUND

Embodiments of the inventive concept described herein relate to a method and device for managing a project by using a data pointer.

Companies are being increased to collect and process a large amount of crowdsourcing-based data obtained as the general crowd participates in some processes of corporate activities.

The crowdsourcing is a compound word of crowd and outsourcing, and means to involve the crowd in some process of corporate activities.

The crowdsourcing has a structure suitable for gig economy having the meaning of fixed-term task traded in a digital marketplace and may be provided in an optimized form for on-demand indicating that a company immediately provides a service depending on the demand of the consumer.

In this way, involving crowd in corporate activities allows companies to hear fresh ideas and practical opinions. The crowd may be paid for participating in feedback. High-quality project results may also be provided to consumers by using a digital work force obtained by combining cloud and AI-based RPA technology, cognitive analysis, and smart analysis.

Moreover, as compared to making products or providing services through external specialized companies, development costs may be reduced, and potential customers may be obtained when the crowd directly participates and brings out the desired results through crowdsourcing.

Nowadays, the crowdsourcing may be used for human resource management (HR Tech) and data labeling services such as data labeling automation, distributed processing design, and online non-face-to-face management. Furthermore, to advance artificial intelligence solutions such as autonomous driving and video learning, the crowdsourcing is being actively used in industries that require a large amount of standardized learning data.

Accordingly, companies are being increased to collect and process a large amount of crowdsourcing-based data obtained as the general crowd participates in some processes of corporate activities. In other words, after opening one project, a company allows the general crowd (i.e., workers) to participate in the corresponding project and then collects necessary information through a result of tasks completed by workers.

Specifically, when one project is opened, a plurality of tasks are allocated to each of a plurality of workers. Each worker performs a plurality of allocated tasks and provides task results. Afterward, a plurality of inspection tasks are allocated to each of a plurality of checkers. Each checker performs the plurality of inspection tasks.

A conventional project is operated to obtain a result through a single task. The conventional project has a simple structure. That is, when source data is provided to a worker, result data is generated by the worker performing a task on the provided source data. However, projects required by companies are gradually changed to have a complex structure including various types of tasks.

Accordingly, an efficient project operation process is needed to classify a project into minimum unit tasks depending on a task type such that a project is capable of being performed for each minimum unit task.

Korean Patent Publication No. 10-2014-0095956 issued on Aug. 4, 2014.

SUMMARY

Embodiments of the inventive concept provide a method and device for managing a project by using a data pointer.

Problems to be solved by the inventive concept are not limited to the problems mentioned above, and other problems not mentioned will be clearly understood by those skilled in the art from the following description.

According to an embodiment, a project management method, which is performed by a project management device and which uses a data pointer, includes transmitting source data of a n-th child project among a plurality of child projects connected in sequential order to a first task processing terminal and requesting the first task processing terminal to process the n-th child project, 'n' being a natural number, receiving result data that is a processing result of the n-th child project from the first task processing terminal, in response to the request, storing the result data in a memory and generating location information at which the result data is stored, recording the location information at a result pointer of the n-th child project, recording the location information at a source pointer of a (n+1)-th child project among the plurality of child projects, obtaining the result data stored at a location indicated by the source pointer as source data of the (n+1)-th child project, transmitting the source data of the (n+1)-th child project to a second task processing terminal and requesting the second task processing terminal to process the (n+1)-th child project. Each of the plurality of child projects includes one or more tasks, and is divided depending on a type of a task included in each of the plurality of child projects. Each of the tasks indicates a minimum unit task to be processed by a task processing terminal.

In some embodiments of the inventive concept, when the n-th child project includes a plurality of tasks, the generating of the location information may include generating one location information by storing result data for each of the plurality of tasks at a same location in the memory.

In some embodiments of the inventive concept, when the (n+1)-th child project is connected in parallel to the (n+2)-th child project among the plurality of child projects, the result data of the n-th child project may be used as source data of the (n+1)-th child project and source data of the (n+2)-th child project.

In some embodiments of the inventive concept, the source pointer of the (n+1)-th child project and the source pointer of the (n+2)-th child project may indicate one address in the memory. The one address in the memory may correspond to location information at which the result data of the n-th child project is stored.

In some embodiments of the inventive concept, when the (n+1)-th child project is connected in parallel to the (n+2)-th child project among the plurality of child projects, the result data of the (n+1)-th child project and the result data of the (n+2)-th child project may be used as source data of the (n+3)-th child project among the plurality of child projects.

In some embodiments of the inventive concept, the source pointer of the (n+3)-th child project is implemented with multiple pointers indicating two different addresses in the memory, the two different addresses in the memory may correspond to location information where the result data of the (n+1)-th child project is stored and location information where the result data of the (n+2)-th child project is stored, respectively.

In some embodiments of the inventive concept, the method may further include updating data attribute information as the plurality of child projects are processed depending on the order.

In some embodiments of the inventive concept, when the 'n' is two or more, the source data of the n-th child project may be result data of the (n−1)-th child project among the plurality of child projects. When 'n' is 1, the source data of the n-th child project may be original data that is previously set up.

According to an embodiment, a project management device using a data pointer includes a communication unit, a memory including at least one process necessary for project management using the data pointer, and a processor operating depending on the process. On the basis of the process, the processor transmits source data of a n-th child project among a plurality of child projects to a first task processing terminal and requests the first task processing terminal to process the n-th child project, wherein 'n' is a natural number, receives result data that is a processing result of the n-th child project from the first task processing terminal, in response to the request, stores the result data in a memory and generates location information at which the result data is stored, records the location information at a result pointer of the n-th child project, records the location information at a source pointer of a (n+1)-th child project among the plurality of child projects, obtains the result data stored at a location indicated by the source pointer as source data of the (n+1)-th child project, transmits the source data of the (n+1)-th child project to a second task processing terminal and requests the second task processing terminal to process the (n+1)-th child project. Each of the plurality of child projects includes one or more tasks, and is divided depending on a type of a task included in each of the plurality of child projects. Each of the tasks indicates a minimum unit task to be processed by a task processing terminal.

In addition, another method and another system for implementing the inventive concept, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 8 is a diagram for describing a result pointer of a previous child project and a source pointer of a next child project when a plurality of child projects are connected in a one-to-one manner, according to an embodiment of the inventive concept;

FIG. 13 is a diagram for describing source pointers of 'N' child projects when a plurality of child projects are connected in a many-to-one (m:1) manner, according to an embodiment of the inventive concept;

FIG. 14 is a diagram for describing metadata for respective source data, according to an embodiment of the inventive concept;

FIG. 17 is a diagram for describing data attribute information at a point in time before a processing request for a previous child project, according to an embodiment of the inventive concept;

FIG. 18 is a diagram for describing data attribute information at a point in time when a previous child project is being processed, according to an embodiment of the inventive concept;

FIG. 19 is a diagram for describing data attribute information at a point in time when a previous child project is completely processed, according to an embodiment of the inventive concept;

FIGS. 20A and 20B are diagrams for describing data attribute information at a point in time when filtering for a previous child project is completed, according to an embodiment of the inventive concept;

FIG. 21 is a diagram for describing metadata for respective source data, according to an embodiment of the inventive concept;

FIG. 23 is a diagram for describing a unit result ID and a result component ID, according to an embodiment of the inventive concept;

DETAILED DESCRIPTION

Figure 1:
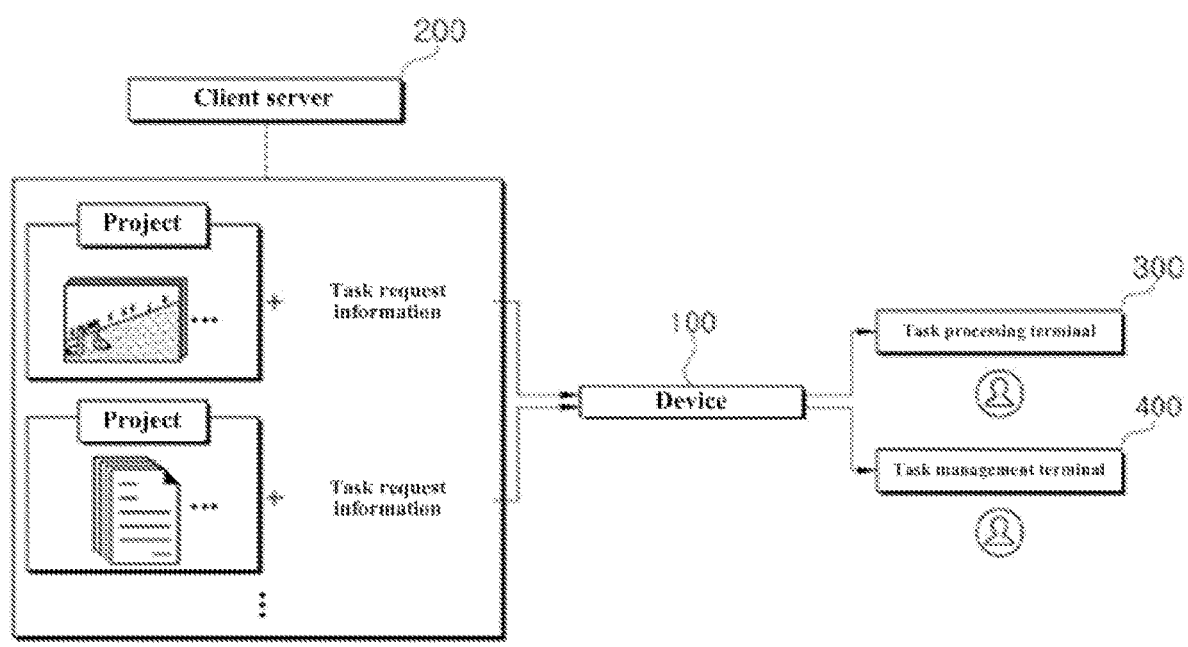
FIG. 1 is a diagram for describing a project management device 100, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

In this specification, a 'device' includes all various devices capable of providing results to a user by performing arithmetic processing. For example, a device may be in a form of a computer and a mobile terminal. The computer may correspond to a server that receives a request from a client and processes information. The mobile terminal may include a mobile phone, a smart phone, personal digital assistants (PDA), a portable multimedia player (PMP), a navigation system, a notebook PC, a slate PC, a tablet PC, a ultrabook, a wearable device (e.g., a smart watch, a smart glass, or a head mounted display (HMD)), and the like.

FIG. 1 is a diagram for describing a project management device 100, according to an embodiment of the inventive concept.

Figure 2:
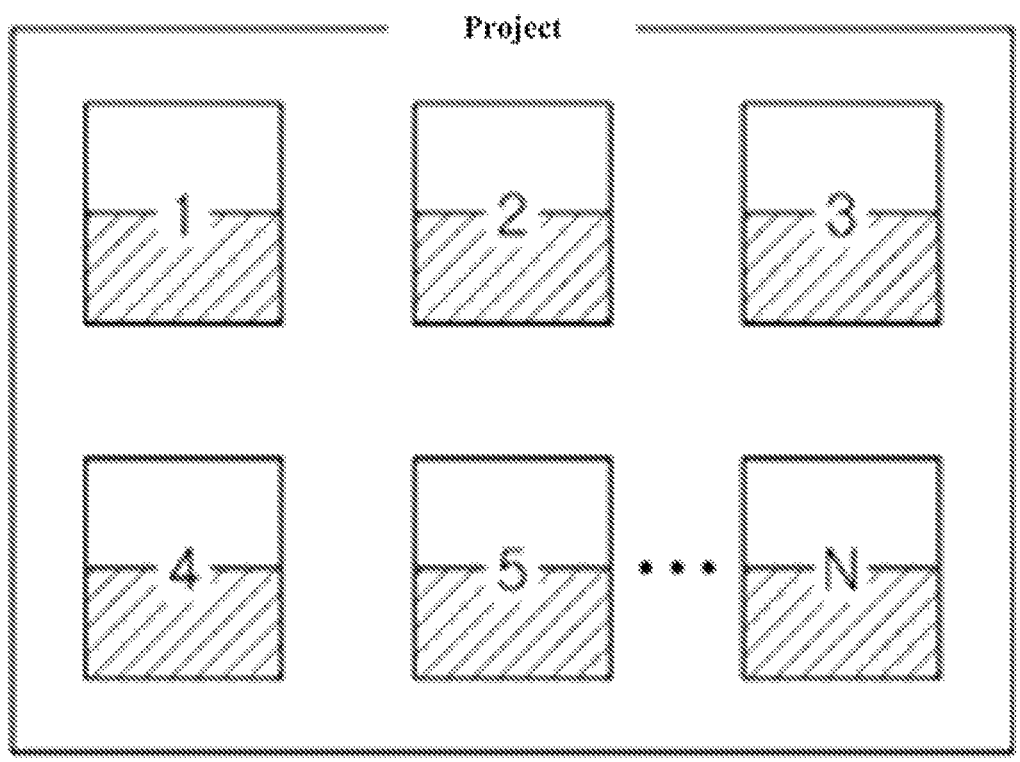
FIG. 2 is a diagram for describing a conventional project operating method.
Figure 2:
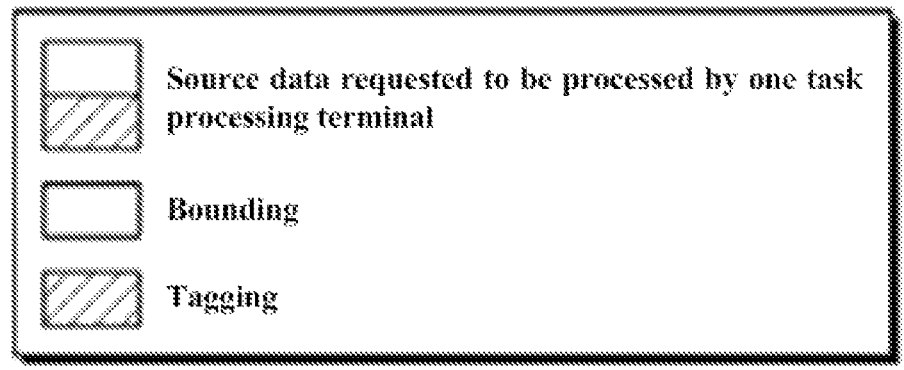

FIG. 2 is a diagram for describing a conventional project operating method.

Figure 3:
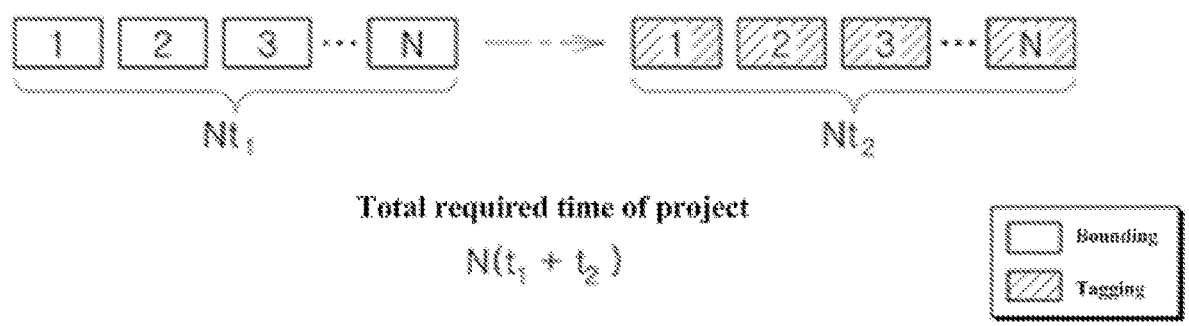
FIG. 3 is a diagram for describing a total required time of a project, according to a conventional project operating method.

FIG. 3 is a diagram for describing a total required time of a project, according to a conventional project operating method.

Figure 4:
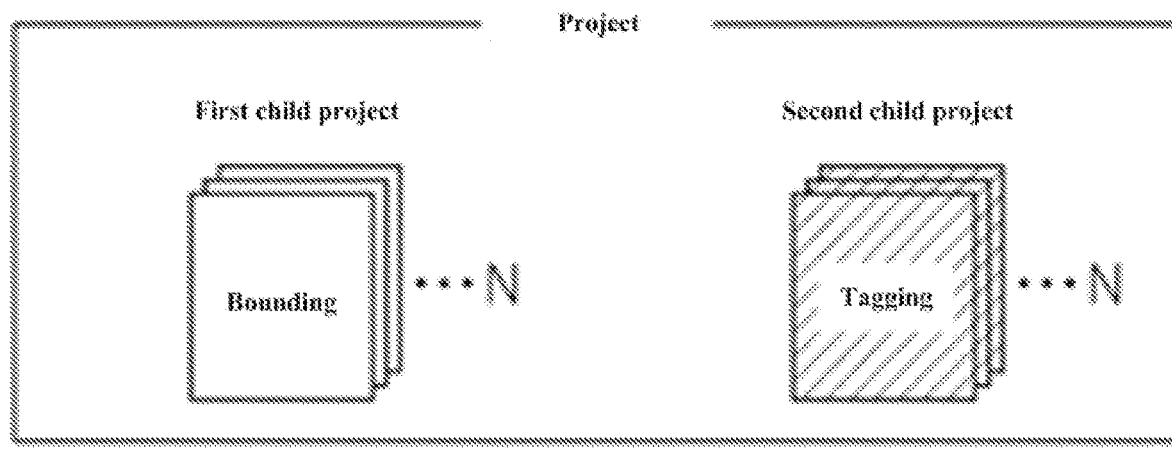
FIG. 4 is a diagram for describing a project operating method, according to an embodiment of the inventive concept.

FIG. 4 is a diagram for describing a project operating method, according to an embodiment of the inventive concept.

Figure 5:
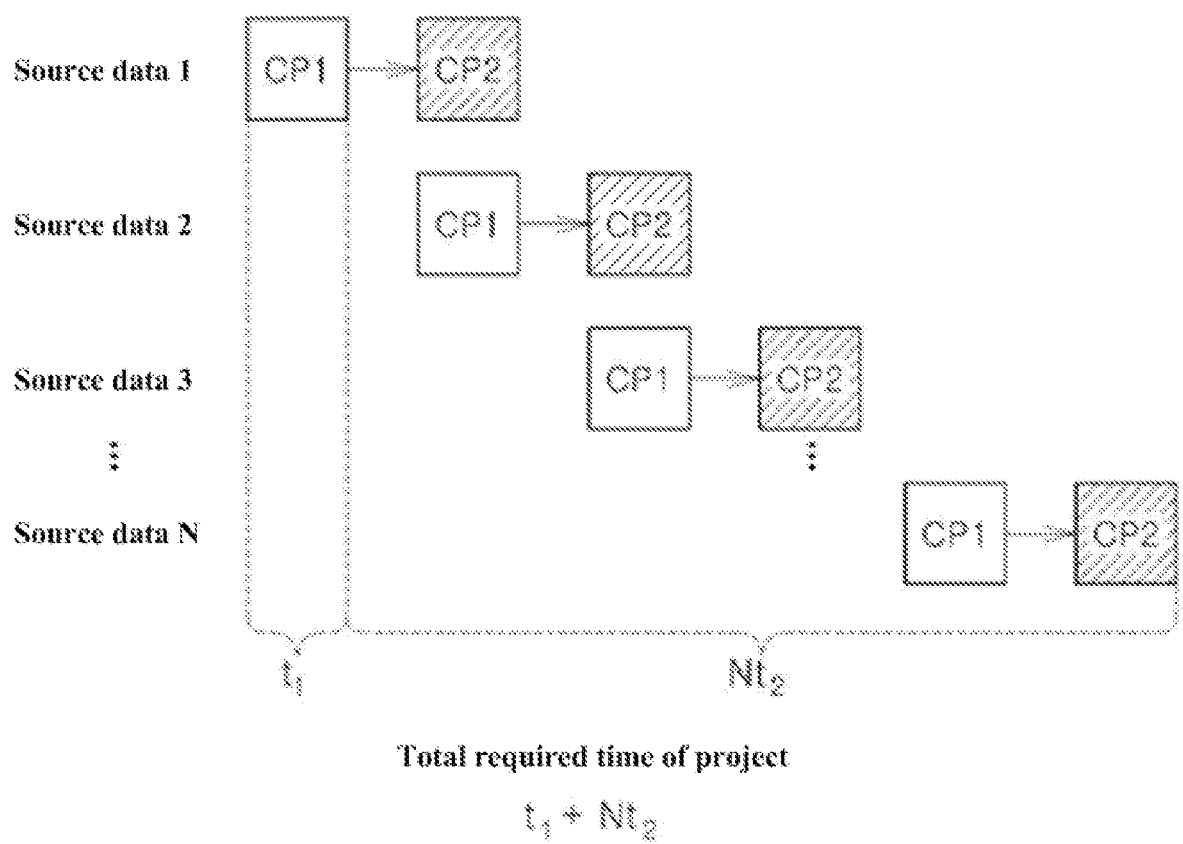
FIG. 5 is a diagram for describing a total required time of a project, according to an embodiment of the inventive concept.

FIG. 5 is a diagram for describing a total required time of a project, according to an embodiment of the inventive concept.

Figure 6:
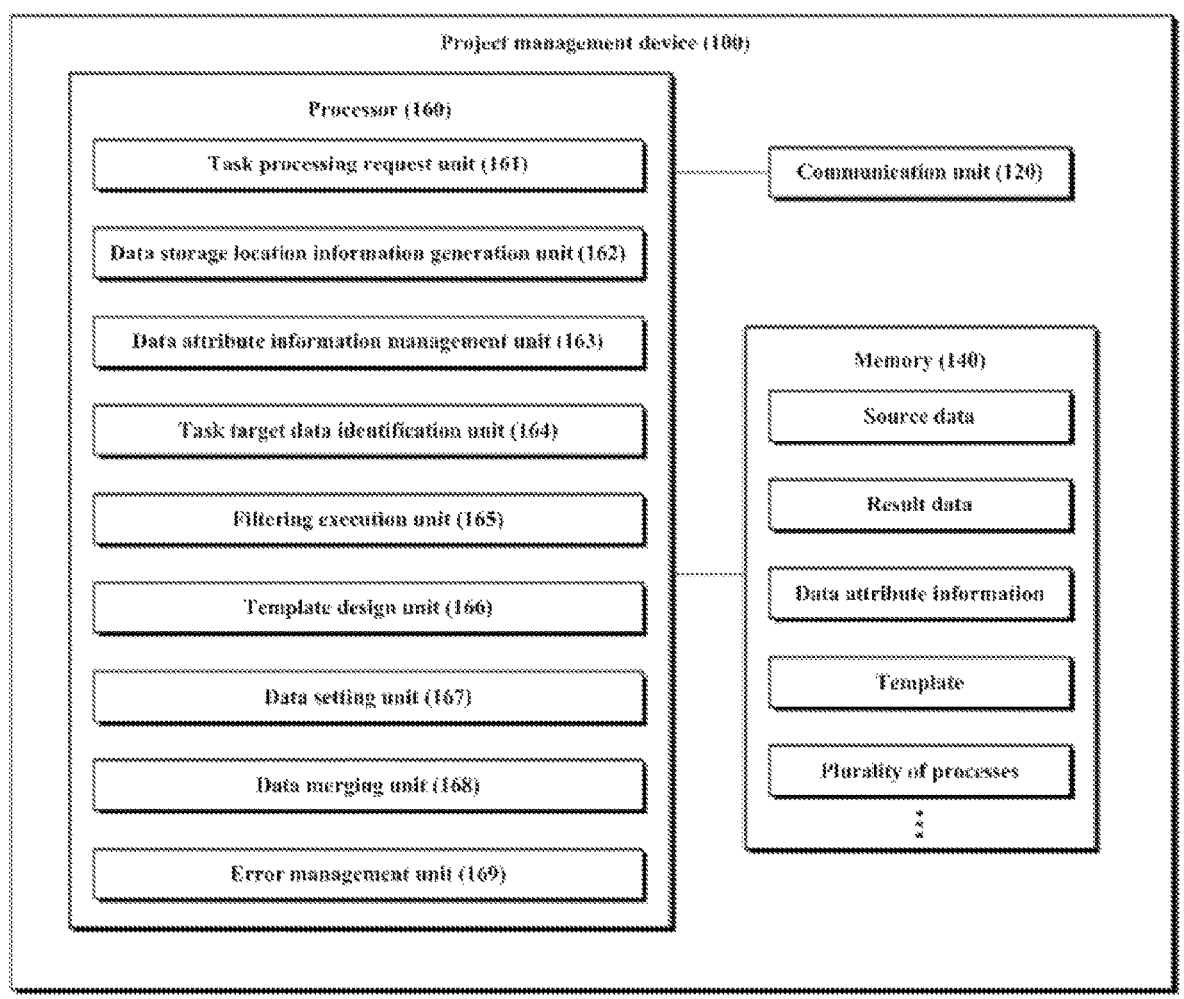
FIG. 6 is a block diagram schematically illustrating a project management device 100, according to an embodiment of the inventive concept.

FIG. 6 is a block diagram schematically illustrating a project management device 100, according to an embodiment of the inventive concept.

Hereinafter, a project management device 100 (hereinafter, referred to as a "device") for smoothly progressing a project according to an embodiment of the inventive concept will be described with reference to FIGS. 1 to 6.

The device 100 may receive a project request from a client server 200. While providing thousands or tens of thousands of source data and task request information to the device 100, the client server 200 may request a project.

Here, thousands or tens of thousands of source data provided from the client server 200 when the project is requested may be original data of the corresponding project. When the project is opened, the source data may be task target data that is requested to be processed by a task processing terminal 300. The source data includes various types of data such as an image, a text, and the like. The task processing terminal 300 has the source data and performs a task requested in the project.

Here, the task request information may mean various pieces of condition information associated with the form of a final result obtained by the client server 200 through the project. In the case where thousands or tens of thousands of source data provided from the client server 200 when a project is requested is image data, the client server 200 may provide the device 100 with condition information for specifying a person (an object) in an image and classifying characteristics of the corresponding person as the task request information.

The device 100, which receives a project request together with the source data and the task request information, may design a project based on the corresponding task request information. For example, the device 100 may design the project including a human bounding task and a tagging task from task request information for specifying a person (object) in an image and classifying the person's characteristics. When the project is completely designed, the device 100 opens the project on a platform, provides a guide based on the task request information together with the source data to each of the plurality of task processing terminals 300, and allows each of the task processing terminals 300 to properly perform the allocated task.

Each of the task processing terminals 300 may perform a bounding task by finding a person in the source data requested to be processed and may perform a tagging task on a bounding box. The result data obtained after these two tasks are completed may be provided to the task management terminal 400 and may be checked by a quality manager. The result data, which is completely checked, may be extracted as the final result. When a task is completely performed on thousands or tens of thousands of requested source data, the corresponding project is terminated. Result data for thousands or tens of thousands of source data is provided as a final result to the client server 200.

The task processing terminal 300 may be a terminal used by a task handler, that is, a worker performing a task on source data. The task processing terminal 300 may be connected to the device 100 over a network, such as a mobile phone, a smartphone, a personal digital assistant (PDA), a portable multimedia player (PMP), or a tablet PC. The task processing terminal 300 may include a camera and may be all types of handheld-based wireless communication device capable of input/output of various pieces of information through a screen. Here, the task processing terminal 300 may participate in the project opened on a platform through an application or website, which is provided by the device 100.

The task management terminal 400 may be a terminal used by a quality manager, that is, a checker that inspects the result data processed by the task handler. The task management terminal 400 may be connected to the device 100 over a network, such as a mobile phone, a smartphone, a personal digital assistant (PDA), a portable multimedia player (PMP), or a tablet PC. The task processing terminal 300 may include a camera and may be all types of handheld-based wireless communication device capable of input/output of various pieces of information through a screen. Here, the task management terminal 400 may participate in the project opened on a platform through an application or website, which is provided by the device 100.

In operating a project in a conventional method, when there are types of tasks required for one source data, the project has been operated in a method of performing another kind of a task after one type of task is completed.

As illustrated in FIG. 2, it will be described that a project includes 'N' source data, and respective source data includes a bounding task and a tagging task.

Referring to FIG. 3, first of all, the device 100 may respectively provide 'N' bounding tasks to the plurality of task processing terminals 300 and may respectively request the plurality of task processing terminals 300 to process the 'N' bounding tasks. When all the 'N' bounding tasks are completed (when the result data for the 'N' bounding tasks is received), the device 100 may again provide each of the 'N' source data, for which the bounding task is completed, to the same or different task processing terminal 300 and may request processing for the tagging task.

As such, the conventional operating method completes processing of 'N' source data for one task type and then completes processing of 'N' source data for another task type. When a bottleneck occurs in the previous task type due to some reasons, the next task type needs to be in a waiting state without a promise, and thus the total required time of a project may be longer.

According to an embodiment, assuming that all the 'N' bounding tasks take the same amount of time and all the 'N' tagging tasks take the same amount of time, the total required time of the project may be calculated as "$N(t_1+t_2)$" in the conventional operating method.

However, unlike the conventional method, the project operating method according to an embodiment of the inventive concept may divide one project into small projects for each minimum unit task and may individually manage the small projects, by classifying the original project into minimum unit tasks and designing a plurality of child projects.

As illustrated in FIG. 2, it will be described that a project includes 'N' source data, and respective source data includes a bounding task and a tagging task.

Referring to FIG. 4, an original project including 'N' source data may be classified into a first child project including 'N' bounding tasks and a second child project including 'N' tagging tasks. When one project is classified into a plurality of child projects in this manner, the device 100 may manage 'N' source data individually. That is, each of the N pieces of source data may be independently processed, in a plurality of child projects.

Referring to FIG. 5, first of all, the device 100 may request one task processing terminal 300 to process the first child project for source data 1. When the first child project is completely processed (when result data for the first child project is received), the device 100 may request another task processing terminal 300 to process the second child project for source data 1.

In the case, independently of source data 1, the device 100 may request one task processing terminal 300 to process the first child project for source data 2. When the first child project is completely processed, the device 100 may request another task processing terminal 300 to process the second child project for source data 2.

Likewise, after the device 100 individually requests processing for the first child project for the rest of the source data. When the result data is received, the device 100 may request processing for the second child project.

As such, the operating method according to an embodiment of the inventive concept may individually process a plurality of child projects for each of 'N' source data. Even when a bottleneck occurs in specific source data due to some reasons, other source data is being processed normally, and thus all of the data do not need to wait as in the conventional method. Accordingly, the total required time of the project may be shortened compared to the conventional method.

According to an embodiment, assuming that the required times of the first child projects for 'N' source data are the same as one another and the required times of the second child projects for 'N' source data are the same as one another, the total required time of the project may be calculated as "$t_1+Nt_2$" in the operating method according to an embodiment of the inventive concept.

Accordingly, as described above, it is assumed that the total required time of the project is "$N(t_1+t_2)$" in the conventional operating method and the total required time of the project is "$t_1+Nt_2$" in the operating method according to an embodiment of the inventive concept. When a project is operated according to an embodiment of the inventive concept, it is possible to save time as much as "$t_1(N-1)$" in proceeding with the project.

Referring to FIG. 6, the device 100 may include a communication unit 120, a memory 140, and a processor 160. Herein, the device 100 may include fewer or more components than the components illustrated in FIG. 6.

The communication unit 120 may include one or more modules that enable wireless communication between the device 100 and the client server 200, between the device 100 and the task processing terminal 300, between the device 100 and the task management terminal 400, between the device 100 and an external server (not illustrated), or between the device 100 and a communication network (not illustrated).

Furthermore, the communication unit 120 may include one or more modules connecting the device 100 to one or more networks.

The memory 140 may store data for supporting various functions of the device 100. The memory 140 may store a plurality of application programs (or applications) running in the device 100, data for an operation of the device 100, and instructions. At least part of the application programs may be present for basic functions of the device 100. In the meantime, the application program may be stored in the memory 140, may be installed in the device 100, and may be driven by the processor 160 so as to perform an operation (or function) of the device 100.

In addition, the memory 140 may store source data of the project, which is thousands or tens of thousands of original data provided from the client server 200.

In addition, the memory 140 may store result data for which the task processing terminal 300 and the task management terminal 400 complete the task and inspection.

Also, the memory 140 may store data attribute information updated as a plurality of child projects are performed for respective source data.

Moreover, the memory 140 may store a template, which is related to the arrangement of result data for a plurality of child projects and which is designed for respective source data, for respective source data.

Besides, the memory 140 may include a plurality of processes for project management. Herein, the plurality of processes will be described below when an operation of the processor 160 is described.

In addition to an operation associated with the application program, the processor 160 may generally control overall operations of the device 100. The processor 160 may provide or process appropriate information or functions to a user, by processing a signal, data, information, or the like, which is input or output through the above-described components, or driving the application program stored in the memory 140.

Besides, the processor 160 may control at least part of the components described with reference to FIG. 6 to operate the application program stored in the memory 140. Furthermore, the processor 160 may combine and operate at least two or more of the components included in the device 100 to operate the application program.

The processor 160 includes a task processing request unit 161, a data storage location information generation unit 162, a data attribute information management unit 163, a task target data identification unit 164, a filtering execution unit 165, a template design unit 166, a data setting unit 167, a data merging unit 168, and an error management unit 169. Herein, the processor 160 may include fewer or more components than the components illustrated in FIG. 6. A description of various components included in the processor 160 will be described later while describing embodiments of a project management method.

Hereinafter, according to an embodiment of the inventive concept, a method of efficiently using result data of a plurality of child projects in the previous order as source data of a plurality of child projects in the next order by using a data pointer will be described with reference to FIGS. 7 to 14.

Figure 7:
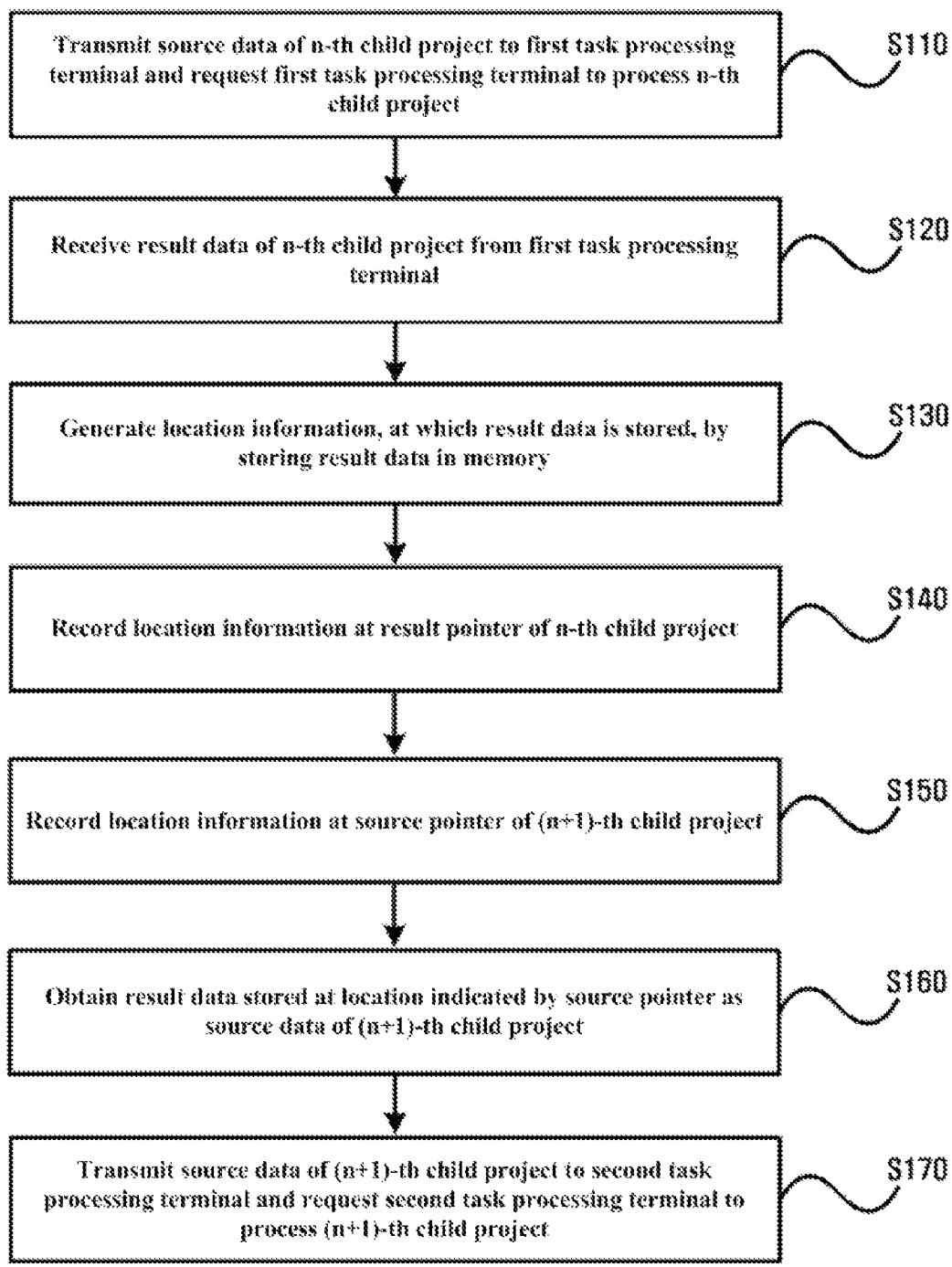
FIG. 7 is a flowchart of a project management method using a data pointer, according to an embodiment of the inventive concept.

FIG. 7 is a flowchart of a project management method using a data pointer, according to an embodiment of the inventive concept.

FIG. 8 is a diagram for describing a result pointer of a previous child project and a source pointer of a next child project when a plurality of child projects are connected in a one-to-one manner, according to an embodiment of the inventive concept.

Figure 9:
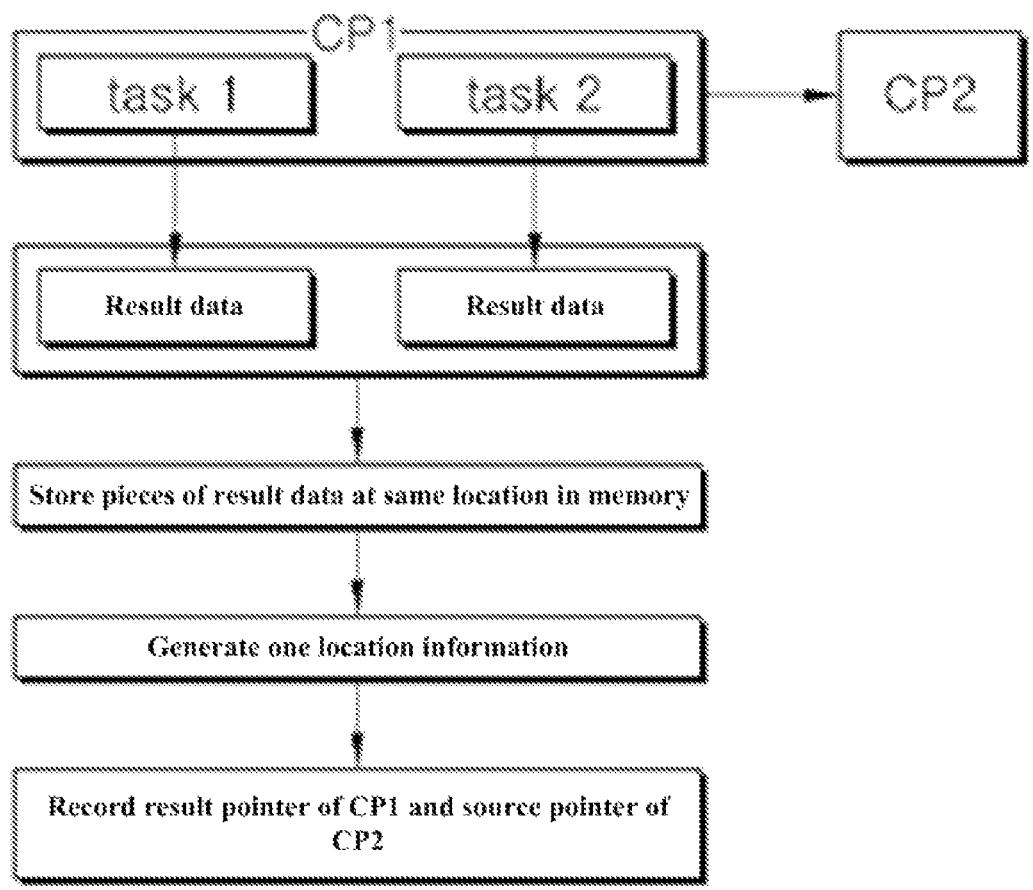
FIG. 9 is a diagram for describing a result pointer of a previous child project and a source pointer of the next child project when a plurality of tasks are included in the previous child project, according to an embodiment of the inventive concept.

FIG. 9 is a diagram for describing a result pointer of a previous child project and a source pointer of the next child project when a plurality of tasks are included in the previous child project, according to an embodiment of the inventive concept.

Figure 10:
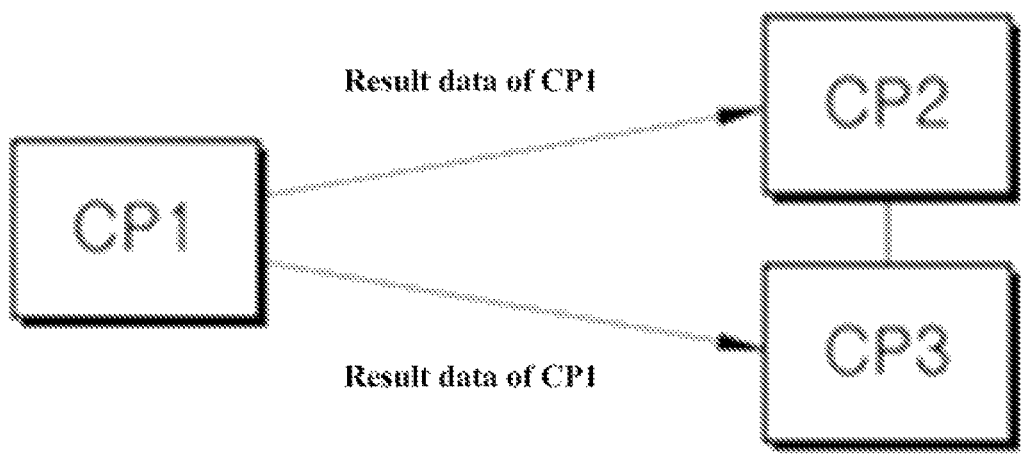
FIG. 10 is a diagram for describing a plurality of child projects connected at a one-to-many (1:m) manner, according to an embodiment of the inventive concept.

FIG. 10 is a diagram for describing a plurality of child projects connected at a one-to-many (1:m) manner, according to an embodiment of the inventive concept.

Figure 11:
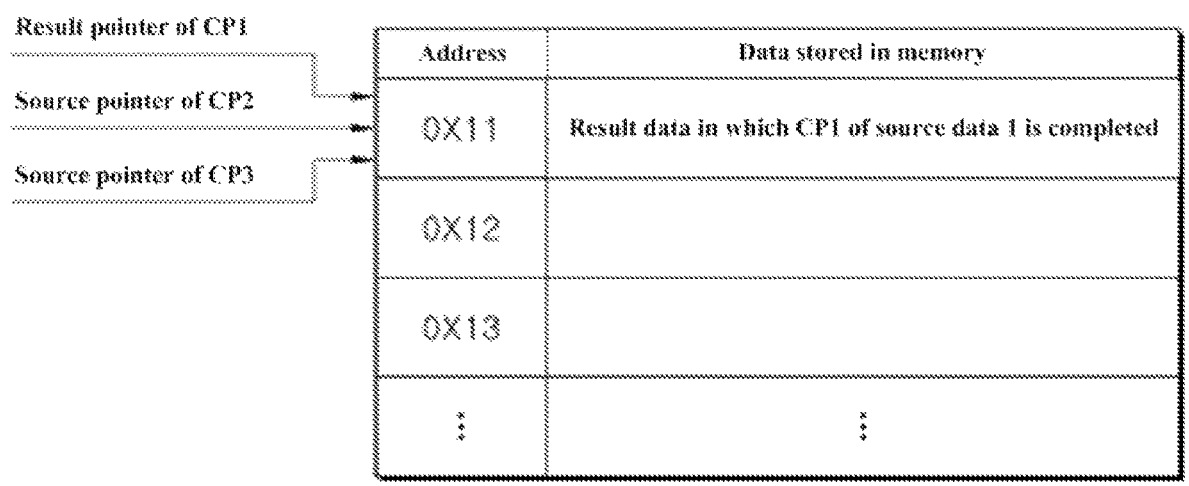
FIG. 11 is a diagram for describing source pointers of 'N' child projects when a plurality of child projects are connected in a one-to-many (1:m) manner, according to an embodiment of the inventive concept.

FIG. 11 is a diagram for describing source pointers of 'N' child projects when a plurality of child projects are connected in a one-to-many (1:m) manner, according to an embodiment of the inventive concept.

Figure 12:
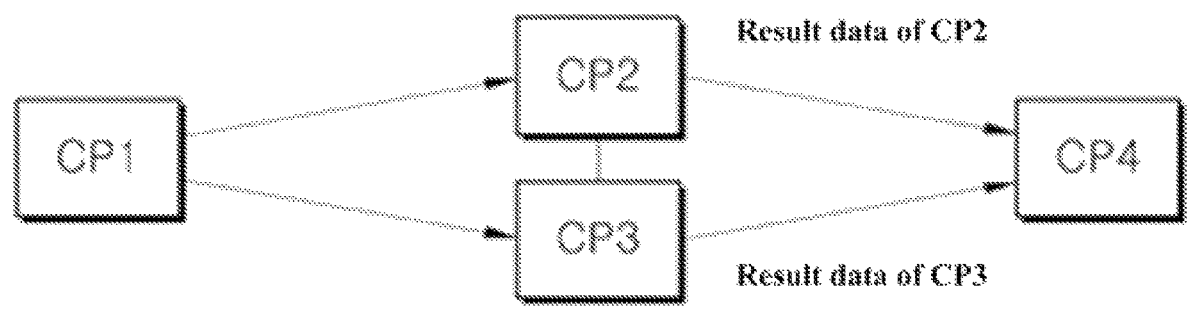
FIG. 12 is a diagram for describing a plurality of child projects connected in a many-to-one (m:1) manner, according to an embodiment of the inventive concept.

FIG. 12 is a diagram for describing a plurality of child projects connected in a many-to-one (m:1) manner, according to an embodiment of the inventive concept.

FIG. 13 is a diagram for describing source pointers of 'N' child projects when a plurality of child projects are connected in a many-to-one (m:1) manner, according to an embodiment of the inventive concept.

FIG. 14 is a diagram for describing metadata for respective source data, according to an embodiment of the inventive concept.

In a conventional method, in general, the source data is original data that is received from the client server 200 and has been prepared through a data setting process including a process, in which a manager manually uploads source data, such that the source data is used for a task.

To configure a workflow that sequentially connects minimum unit tasks, the result data generated through one task needs to be used as source data of another task. In this case, to efficiently perform several minimum unit tasks connected in sequential order, the process needs to be performed automatically without the intervention of a manager. Conventionally, the process is performed in such a way in which the manager manually copies result data of the previous task and provides the result data of the previous task as source data of the next task. This is very inefficient because time, CPU, memory, and storage resources are consumed in proportion to the capacity and quantity of data in a data copy process.

According to an embodiment of the inventive concept, the processor 160 of the device 100 may use result data of a child project in the previous order as source data of the child project in the next order among a plurality of child projects that are classified based on the minimum unit task and connected in sequential order, by automatically performing a first process required for project management using a data pointer.

Hereinafter, an operation of the processor 160 according to the first process will be described in detail.

Referring to FIG. 7, the task processing request unit 161 included in the processor 160 of the device 100 may transmit source data of an n-th child project to the first task processing terminal 300 among a plurality of child projects connected in sequential order and then may request the first task processing terminal 300 to process the n-th child project (S110).

In this case, 'n' may be a natural number. For example, when a total of five child projects are connected in sequential order and 'n' is 3, the n-th child project may mean a child project in the third order among the five child projects.

In addition, when 'n' is 1, the source data of the n-th child project may be original data that is previously set up. As for the first child project (a child project having the first order) among the total of five child projects connected in sequential order, there is no child project to be processed previously, and thus there is no result data for the previous task. Accordingly, the source data of the first child project may be original data such as image data or text data, which is provided by a client through the client server 200.

And, when 'n' is two or more, the source data of the n-th child project may be result data of the (n−1)-th child project among the plurality of child projects. For example, when the total of five child projects are connected in sequential order, and when 'n' is 2, source data of the second child project (a child project having the second order) transmitted to the first task processing terminal 300 may be result data of the first child project (a child project having the first order). In more detail, the source data of the second child project may be data in which the processing result for the first child project is displayed in the original data.

Here, each of the plurality of child projects includes one or more tasks, and may be divided depending on the type of a task included therein. The task may indicate a minimum unit task to be processed by the task processing terminal 300.

As described above, when an original project requested by the client server 200 includes 'N' source data ('N' original data), and respective source data includes a bounding task and a tagging task, each of 'N' source data may be designed as two child projects. In other words, each of the 'N' source data may be divided into a first child project including a task related to the bounding task and a second child project including a task related to the tagging task. Accordingly, the first task processing terminal 300, which has been requested to process the first child project, may process only the bounding task. The first task processing terminal 300, which has been requested to process the second child project, may process only the tagging task.

Next, the communication unit 120 of the device 100 may receive result data that is the processing result of the n-th child project from the first task processing terminal 300 in response to a request (S120).

When 'n' is 1, the result data of the first child project may be data in which the processing result for the first child project is displayed in the original data provided by the client through the client server 200.

Moreover, when 'n' is not less than 2 (e.g., when 'n' is 2), the result data of the second child project may be data in which the processing result for the second child project is again overlapped and displayed in the data (source data of the second child project) where the processing result for the first child project is displayed in the original data.

Next, the data storage location information generation unit 162 included in the processor 160 of the device 100 may generate location information, at which the result data is stored, by storing the result data in the memory 140 (S130).

When the result data for the n-th child project is received from the first task processing terminal 300, the data storage location information generation unit 162 may store the corresponding result data at a specific location in the memory 140 and may generate location information including an address value of a specific location at which the result data is stored.

Next, the data attribute information management unit 163 included in the processor 160 of the device 100 may record the location information at a result pointer of the n-th child project (S140).

Next, the data attribute information management unit 163 may record the location information at a source pointer of the (n+1)-th child project among the plurality of child projects (S150).

Next, the task target data identification unit 164 included in the processor 160 of the device 100 may obtain the result data stored at the location indicated by the source pointer as the source data of the (n+1)-th child project (S160).

The data attribute information management unit 163 may record and manage various data attribute information generated or changed as the plurality of child projects are processed. Here, the data attribute information may include the progress status of each of the plurality of child projects, a source pointer, and a result pointer, but is not limited thereto.

The task target data identification unit 164 may identify result data of a child project in the previous order as task target data at a point in time when a specific condition is satisfied, and then may obtain the result data as the source data of a child project in the next order. In this case, the specific condition refers to whether a specific address value is recorded at the source pointer of the child project in the next order. The task target data identification unit 164 may determine that the specific condition is satisfied when the specific address value is recorded at the source pointer of the child project in the next order, may identify result data stored at a location indicated by the specific address value as the task target data, and may obtain the result data as the source data of the child project in the next order.

When location information at which the result data of the n-th child project is stored is generated in operation S130, a value of the result pointer of the n-th child project may be changed and recorded from a garbage value or null value to an address value corresponding to the location information.

At the same time, a value of the source pointer of the (n+1)-th child project may also be changed and recorded from a garbage value or null value to an address value corresponding to the location information.

That is, the result pointer of the n-th child project and the source pointer of the (n+1)-th child project may indicate the same address value.

Referring to FIG. 8, when the result data of a first child project CP1 of source data 1 among thousands or tens of thousands of source data of the original project is stored at a location corresponding to an address value of "0X11" in the memory 140, a result pointer of the first child project CP1 of source data 1 and a source pointer of a second child project CP2 of source data 1 may identically indicate the address value of "0X11".

Moreover, the task target data identification unit 164 may obtain the result data stored at the location corresponding to the address value of "0X11" as the source data of the second child project CP2.

According to an embodiment, when the n-th child project includes a plurality of tasks, one location information may be generated by storing result data for each of the plurality of tasks at the same location in the memory.

Referring to FIG. 9, when the first child project CP1 among a plurality of child projects includes a task (task 1) related to a bounding task and a task (task 2) related to a tagging task (i.e., a total of two tasks), result data of the task (task 1) related to the bounding task and result data of the task (task 2) related to the tagging task may be stored at the same location in the memory. That is, even when pieces of result data for one child project are received, the pieces of result data for one child project are stored at the same location in a bundle, and thus only one location information may be generated with respect to one child project. As described above, the generated location information may be recorded at the result pointer of the first child project CP1 and the source pointer of the second child project CP2.

Moreover, the task target data identification unit 164 may obtain the result data, which is stored at the location corresponding to one address value in a bundle, as the source data of the second child project CP2.

Next, the task processing request unit 161 may transmit source data of the (n+1)-th child project to the second task processing terminal 300 and then may request the second task processing terminal 300 to process the (n+1)-th child project (S170).

When the n-th child project includes a task related to the bounding task, and the (n+1)-th child project includes a task related to the tagging task, the second task processing terminal 300 performs the tagging task on result data of the n-th child project (i.e., the bounding-processed data).

According to an embodiment, when the (n+1)-th child project is connected in parallel to the (n+2)-th child project among the plurality of child projects, the result data of the n-th child project may be used as source data of the (n+1)-th child project and source data of the (n+2)-th child project.

Referring to FIG. 10, when the second child project CP2 and a third child project CP3 among a total of three child projects are connected in parallel and are connected to the front end of the first child project CP1, result data of the first child project CP1 may be provided as source data of the second child project CP2 and source data of the third child project CP3. Accordingly, a handler who receives a processing request for the second child project CP2 and a handler who receives a processing request for the third child project CP3 perform their respective tasks (a task included in each child project) with the same result data.

In detail, the source pointer of the (n+1)-th child project and the source pointer of the (n+2)-th child project may indicate one address in the memory 140. The one address in the memory 140 may correspond to location information at which the result data of the n-th child project is stored.

Referring to FIG. 11, when the result data of the first child project CP1 of source data 1 among thousands or tens of thousands of source data of the original project is stored at a location corresponding to an address value of "0X11" in the memory 140, a result pointer of the first child project CP1 of source data 1, a source pointer of the second child project CP2 of source data 1, and a source pointer of the third child project CP3 of source data 1 may identically indicate the address value of "0X11".

Moreover, the task target data identification unit 164 may obtain the result data stored at the location corresponding to the address value of "0X11" as the source data of the second child project CP2 and the source data of the third child project CP3.

According to another embodiment, when the (n+1)-th child project is connected in parallel to the (n+2)-th child project among the plurality of child projects, the result data of the (n+1)-th child project and the result data of the (n+2)-th child project may be used as source data of the (n+3)-th child project among the plurality of child projects.

Referring to FIG. 12, when the second child project CP2 and the third child project CP3 are connected in parallel and are connected between the front end of the first child project CP1 and the rear end of a fourth child project CP4 among a total of four child projects, result data of the first child project CP1 may be provided as source data of the second child project CP2 and source data of the third child project CP3. This is the same as described above, and thus a description thereof will be omitted to avoid redundancy. Besides, the result data of the second child project CP2 and the result data of the third child project CP3 may be provided as source data of the fourth child project CP4. Accordingly, a handler who receives a processing request for the fourth child project CP4 performs the same task (a task included in the fourth child project) with the two result data.

In detail, the source pointer of the (n+3)-th child project is implemented with multiple pointers indicating two different addresses in the memory 140, the two different addresses in the memory 140 may correspond to location information where the result data of the (n+1)-th child project is stored and location information where the result data of the (n+2)-th child project is stored, respectively.

Referring to FIG. 13, when, among thousands or tens of thousands of source data of the original project, the result data of the second child project CP2 of source data 1 is stored at a location corresponding to the address value of "0X12" in the memory 140 and the result data of the third child project CP3 of source data 1 is stored at a location corresponding to the address value of "0X13" in the memory 140, the result pointer of the second child project CP2 of source data 1 may indicate the address value of "0X12", the result pointer of the third child project CP3 may indicate the address value of "0X13", and the source pointer of the fourth child project CP4 may indicate two address values of "0X12" and "0X13".

Moreover, the task target data identification unit 164 may obtain both the result data stored at the location corresponding to the address value of "0X12" and the result data stored at the location corresponding to the address value of "0X13" as source data of the fourth child project CP4.

In the meantime, a project management method using a data pointer according to an embodiment of the inventive concept may further include updating data attribute information as the plurality of child projects are processed depending on the sequential order.

As described above, the data attribute information management unit 163 may record and manage various data attribute information generated or changed as the plurality of child projects are processed. For example, when a specific address value is recorded at the result pointer of the first child project and the source pointer of the second child project after the result data of the first child project is received, result pointer information of the first child project and source pointer information of the second child project included in the data attribute information may be updated as the corresponding address value. In this case, even when a specific item is updated as new information in updating data attribute information, the existing information may not disappear, but the existing information and the new information may be accumulated and stored.

As such, when the data attribute information is updated as a plurality of child projects are processed, metadata for source data 1 may be stored and managed. That is, the metadata for source data 1 may indicate data in which all histories related to updates for a plurality of child projects of source data 1 are recorded.

Referring to FIG. 14, the metadata of source data 1 may be managed after a task processing terminal ID for all child projects, a source pointer value, and a result pointer value are recorded. Items managed through metadata are not limited thereto. All data related to respective source data may be recorded and managed.

As described above, according to an embodiment of the inventive concept, various data connection configurations (e.g., 1:1, m:1, and 1:m) are possible by using data and a pointer structure, and thus there is no need to copy the data itself. Accordingly, even when a plurality of child projects are complexly connected, it is possible to automatically provide result data of the previous task as source data of the next task by using a pointer, thereby optimizing performance and resource use.

Hereinafter, according to an embodiment of the inventive concept, a method of using result data of a plurality of child projects in the previous order as source data of a plurality of child projects in the next order through condition verification by using data filtering will be described with reference to FIGS. 15 to 21.

Figure 15:
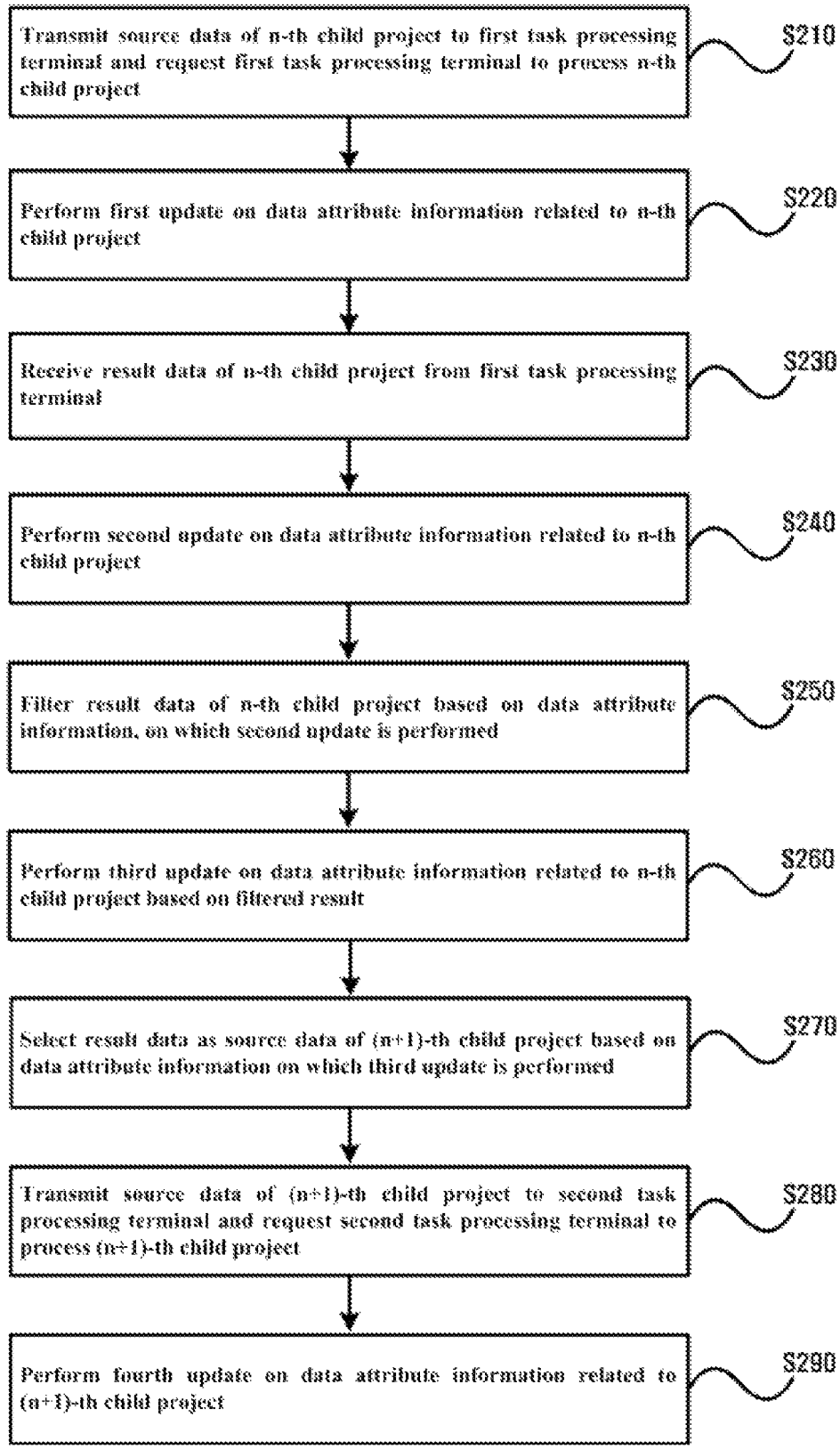
FIG. 15 is a flowchart of a project management method using data filtering, according to an embodiment of the inventive concept.

FIG. 15 is a flowchart of a project management method using data filtering, according to an embodiment of the inventive concept.

Figure 16:
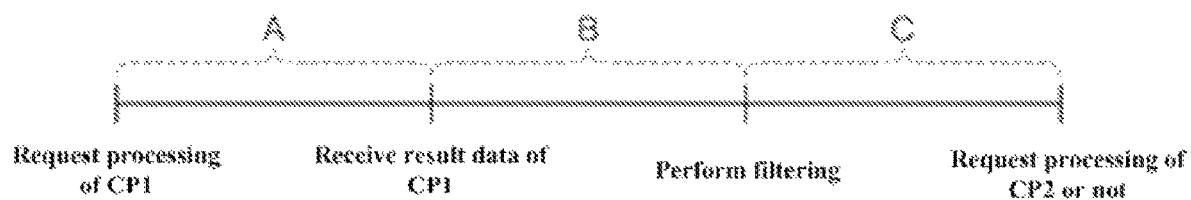
FIG. 16 is a diagram for describing result data filtering, according to an embodiment of the inventive concept.

FIG. 16 is a diagram for describing result data filtering, according to an embodiment of the inventive concept.

FIG. 17 is a diagram for describing data attribute information at a point in time before a processing request for a previous child project, according to an embodiment of the inventive concept.

FIG. 18 is a diagram for describing data attribute information at a point in time when a previous child project is being processed, according to an embodiment of the inventive concept.

FIG. 19 is a diagram for describing data attribute information at a point in time when a previous child project is completely processed, according to an embodiment of the inventive concept.

FIGS. 20A and 20B are diagrams for describing data attribute information at a point in time when filtering for a previous child project is completed, according to an embodiment of the inventive concept.

FIG. 21 is a diagram for describing metadata for respective source data, according to an embodiment of the inventive concept.

According to an embodiment of the inventive concept, the processor 160 of the device 100 may use the result data of the child project in the previous order as the source data of the child project in the next order among a plurality of child projects that are classified based on the minimum unit task and connected in sequential order, by automatically performing a second process required for project management using data filtering.

Hereinafter, an operation of the processor 160 according to the second process will be described in detail.

Referring to FIG. 15, the task processing request unit 161 included in the processor 160 of the device 100 may transmit source data of an n-th child project to the first task processing terminal 300 among a plurality of child projects connected in sequential order and then may request the first task processing terminal 300 to process the n-th child project (S210).

In this case, 'n' may be a natural number. For example, when a total of five child projects are connected in sequential order and 'n' is 3, the n-th child project may mean a child project in the third order among the five child projects.

In addition, when 'n' is 1, the source data of the n-th child project may be original data that is previously set up. As for the first child project (a child project having the first order) among the total of five child projects connected in sequential order, there is no child project to be processed previously, and thus there is no result data for the previous task. Accordingly, the source data of the first child project may be original data such as image data or text data, which is provided by a client through the client server 200.

And, when 'n' is two or more, the source data of the n-th child project may be result data of the (n−1)-th child project among the plurality of child projects. For example, when the total of five child projects are connected in sequential order, and when 'n' is 2, source data of the second child project (a child project having the second order) transmitted to the first task processing terminal 300 may be result data of the first child project (a child project having the first order). In more detail, the source data of the second child project may be data in which the processing result for the first child project is displayed in the original data.

Here, each of the plurality of child projects includes one or more tasks, and may be divided depending on the type of a task included therein. The task may indicate a minimum unit task to be processed by the task processing terminal 300.

As described above, when an original project requested by the client server 200 includes 'N' source data ('N' original data) (here, 'N' is a natural number), and respective source data includes a bounding task and a tagging task, each of 'N' source data may be designed as two child projects. In other words, each of the 'N' source data may be divided into a first child project including a task related to the bounding task and a second child project including a task related to the tagging task. Accordingly, the first task processing terminal 300, which has been requested to process the first child project, may process only the bounding task. The first task processing terminal 300, which has been requested to process the second child project, may process only the tagging task.

Next, the data attribute information management unit 163 included in the processor 160 of the device 100 may perform a first update on data attribute information related to the n-th child project (S220).

The data attribute information management unit 163 may record and manage various data attribute information generated or changed as the plurality of child projects are processed. Here, the data attribute information may include, but is not limited to, a progress status of each of a plurality of child projects, a final unit task ID, a processing status, a filtering status, and a filter pass list.

Here, the data attribute information may be updated as the plurality of child projects are processed in the order in which the plurality of child projects are sequentially connected. That is, the data attribute information such as a final unit task ID, a processing status, a filtering status, a filter pass list, or the like may be updated in real time as the plurality of child projects are processed.

Referring to FIG. 16, when 'n' is 1, operation S220 may be performed in section A (time point A). That is, after processing of the first child project CP1 among a plurality of child projects is requested, the first update may be performed.

As illustrated in FIG. 17, in the data attribute information before the processing of the first child project CP1 is requested, the final unit task ID has a null value, the processing status has a null value, the filtering status has a false value, and the filter pass list has a null value.

Afterward, as shown in FIG. 18, when the processing of the first child project CP1 is requested, in the data attribute information, the final unit task ID may be updated from a null value to an ID (CP1) related to the n-th child project, and the processing status may be updated from a null value to a value indicating "progress". The remaining information (filtering status and filter pass list) may be maintained as it is before the filtering is performed.

This corresponds to a point in time before the task is assigned to anyone before the processing of the first child project CP1, which has the first order, among a plurality of child projects, is requested. Accordingly, values of the final unit task ID, the processing status, the filtering status, and the filter pass list were all null values (default values). Afterward, when the processing is requested, the corresponding child project CP1 is assigned to the specific task processing terminal 300 and thus the task is in progress. Accordingly, the final unit task ID and the processing status are updated depending on the corresponding status.

Referring to FIG. 16, when 'n' is 2 or more, operation S220 may be performed in the same manner as operation S290, which will be described later.

Next, the communication unit 120 of the device 100 may receive result data that is the processing result of the n-th child project from the first task processing terminal 300 in response to a request (S230).

When 'n' is 1, the result data of the first child project may be data in which the processing result for the first child project is displayed in the original data provided by the client through the client server 200.

Moreover, when 'n' is not less than 2 (e.g., when 'n' is 2), the result data of the second child project may be data in which the processing result for the second child project is again overlapped and displayed in the data (source data of the second child project) where the processing result for the first child project is displayed in the original data.

Next, when the result data is received, the data attribute information management unit 163 may perform a second update on data attribute information related to the n-th child project (S240).

Referring to FIG. 16, when 'n' is 1, operation S240 may be performed in section B (time point B). That is, after processing of the first child project CP1 among a plurality of child projects is completed, the second update may be performed.

As illustrated in FIG. 19, in the data attribute information in a state where the processing of the first child project CP1 is completed, The final unit task ID may be maintained as an ID related to the n-th child project, and the processing status may be updated from a value indicating "progress" to a value indicating "completion". The remaining information (filtering status and filter pass list) may be maintained as it is before the filtering is performed.

Even when 'n' is 2 or more, the second update may be performed as described above.

Next, the filtering execution unit 165 included in the processor 160 of the device 100 may filter result data of the n-th child project based on the data attribute information, on which the second update is performed (S250).

When the processing status is updated to a value indicating "completion" in operation S240, the filtering execution unit 165 may determine that the received result data of the n-th child project satisfies a filtering target condition, and may filter the corresponding result data.

According to an embodiment, when both the processing status for the (n−1)-th child project and the processing status for the (n−2)-th child project are updated to a value indicating "completion" in the case where the (n−1)-th child project and the (n−2)-th child project are connected in parallel and are connected to the rear end of the n-th child project, the filtering execution unit 165 may determine that the result data of the (n−1)-th child project and the result data of the (n−2)-th child project satisfy the filtering target condition, and may perform filtering.

For example, when 'n' is 3, the first child project and the second child project are connected in parallel. When the processing status among the data attribute information about the first child project is updated to a value indicating "completion" and the processing status among the data attribute information about the second child project is updated to a value indicating "completion", the filtering execution unit 165 filters the two result data.

In operation S250, the filtering execution unit 165 may filter result data that satisfies the filtering target condition. In this case, when the filtered result data is result data of the n-th child project having the previous order of the (n+1)-th child project, the filtering execution unit 165 may determine that the filter condition for the corresponding result data is verified.

On the other hand, when the filtered result data is result data of another child project that does not have the previous order of the (n+1)-th child project, the filtering execution unit 165 may determine that the filter condition for the corresponding result data is not verified.

That is, a plurality of child projects are connected many-to-one (m:1) (here, 'm' is a natural number greater than or equal to 2). when only at least one child project among the 'm' child projects in the previous order is connected to a child project in the next order, and the remaining child projects are not connected to the child project in the next order, it may be determined that the filter condition for only the result data of the child projects connected to the child project in the next order is verified.

For example, when the first child project is connected to the third child project in sequential order, but the second child project is not connected to the third child project in sequential order in the case where the first child project and the second child project are connected in parallel and are connected to the front end of the third child project, the filtering execution unit 165 may filter both result data of the first child project and result data of the second child project, may determine that the filter condition for the result data of the first child project is verified, and may determine that the filter condition for the result data of the second child project is not verified.

Next, the data attribute information management unit 163 may perform a third update on data attribute information related to the n-th child project based on the filtered result (S260).

Referring to FIG. 16, when 'n' is 1, operation S260 may be performed in section C (time point C).

In detail, in operation S250, when it is determined that the filter condition for the result data of the n-th child project is verified, as shown in FIG. 20A, the filtering status among the data attribute information for the result data of the n-th child project is updated from a false value to a true value, and the filter pass list may be updated to include a filter ID related to the (n+1)-th child project.

On the other hand, in operation S250, when it is determined that the filter condition for the result data of the n-th child project is not verified, as shown in FIG. 20B, the filtering status among the data attribute information for the result data of the n-th child project is updated from a false value to a true value, and the filter pass list may maintain a null value as it is.

According to an embodiment, in the case where a plurality of child projects are connected in a one-to-many (1:m) manner (here, 'm' is a natural number greater than or equal to 2), when it is determined that the filter condition (whether it is connected to the next child project) of the result data of the child project in the previous order is verified with respect to all 'm' child projects in the next order, the filter pass list among the data attribute information about a child project in the previous order may be updated to include filter IDs for all of the 'm' child projects.

For example, in the case where the second child project and the third child project are connected in parallel and are connected to the rear end of the first child project, when the first child project is connected to both the second child project and the third child project in sequential order, the filter pass list among the data attribute information for the first child project may be updated to include both a filter ID related to the second child project and a filter ID related to the third child project.

Even when 'n' is 2 or more, the third update may be performed as described above.

Next, the task target data identification unit 164 included in the processor 160 of the device 100 may select the result data as source data of the (n+1)-th child project among the plurality of child projects based on the data attribute information on which the third update is performed (S270).

Next, the task processing request unit 161 may transmit source data of the (n+1)-th child project to the second task processing terminal and then may request the second task processing terminal to process the (n+1)-th child project (S280).

The task target data identification unit 164 may identify result data of a child project in the previous order as task target data at a point in time when a specific condition is satisfied, and then may obtain the result data as the source data of a child project in the next order. In this case, the specific condition may refer to whether a filter ID related to the (n+1)-th child project is included in the filter pass list among the data attribute information.

In detail, referring to FIG. 20A, when the filter ID related to the (n+1)-th child project is included in the filter pass list, the task target data identification unit 164 may determine that the received result data of the n-th child project satisfies the task target data condition, may select the received result data as the source data of the (n+1)-th child project, may transmit the selected source data to the second task processing terminal 300, and may request the second task processing terminal 300 to process the (n+1)-th child project.

On the other hand, referring to FIG. 20B, when the filter pass list includes the filter ID related to the (n+1)-th child project (when it is a null value or includes an ID related to another child project), the task target data identification unit 164 may determine that the result data of the received n-th child project does not satisfy the task target data condition, and may not select the result data as the source data of the (n+1)-th child project.

According to an embodiment, in the case where the (n+1)-th child project and the (n+2)-th child project are connected in parallel in the next order of the n-th child project, only when the filter pass list includes both the filter ID related to the (n+1)-th child project and the filter ID related to the (n+2)-th child project, the task target data identification unit 164 may determine that the received result data of the n-th child project satisfies the target data condition, and may select the result data as source data of the (n+1)-th child project and source data of the (n+2)-th child project.

According to another embodiment, in the case where the (n+1)-th child project and the (n+2)-th child project are connected in parallel, but only the (n+1)-th child project is connected to the n-th child project, when the filter pass list includes the filter ID related to the (n+1)-th child project, the task target data identification unit 164 may determine that the result data of the n-th child project satisfies the target data condition, and may select the result data as source data of the (n+1)-th child project.

Next, the data attribute information management unit 163 may perform a fourth update on data attribute information related to the (n+1)-th child project (S290).

Referring to FIG. 16, when 'n' is 1, operation S290 may be performed after section C (time point C). That is, after processing of the second child project CP2 among a plurality of child projects is requested, the fourth update may be performed.

In detail, in operation S290, in the data attribute information related to the (n+1)-th child project, the final unit task ID may be updated from an ID related to the n-th child project in the previous order to an ID related to the (n+1)-th child project, and the processing status may be updated from a value indicating that the processing of the n-th child project in the previous order is completed, to a value indicating the progress of the (n+1)-th child project. In this case, the filtering status may be changed from a true value to a false value, and the filter pass list may be changed back to null value, but is not limited thereto. For example, the filter pass list may continuously include a filter ID related to the previous child project.

In the meantime, when the data attribute information is updated as a plurality of child projects are processed, metadata for source data 1 may be stored and managed. That is, the metadata for source data 1 may indicate data in which all histories related to updates for a plurality of child projects of source data 1 are recorded.

Referring to FIG. 21, the metadata of source data 1 may be managed after values of a task processing terminal ID, a processing status, a filtering status, and a filter pass list for all of the child projects are recorded. Items managed through metadata are not limited thereto. All data related to respective source data may be recorded and managed.

As described above, according to another embodiment of the inventive concept, a project may be expanded and operated by configuring an independent filter process between a child project and a child project. When a plurality of child projects are complicatedly connected, result data of a child project of the previous task may be exactly provided as source data of a child project of the next task.

Hereinafter, according to an embodiment of the inventive concept, a method of merging result data of a plurality of child projects into a template preset for the corresponding source data by using data merging will be described with reference to FIGS. 22 to 25.

Figure 22:
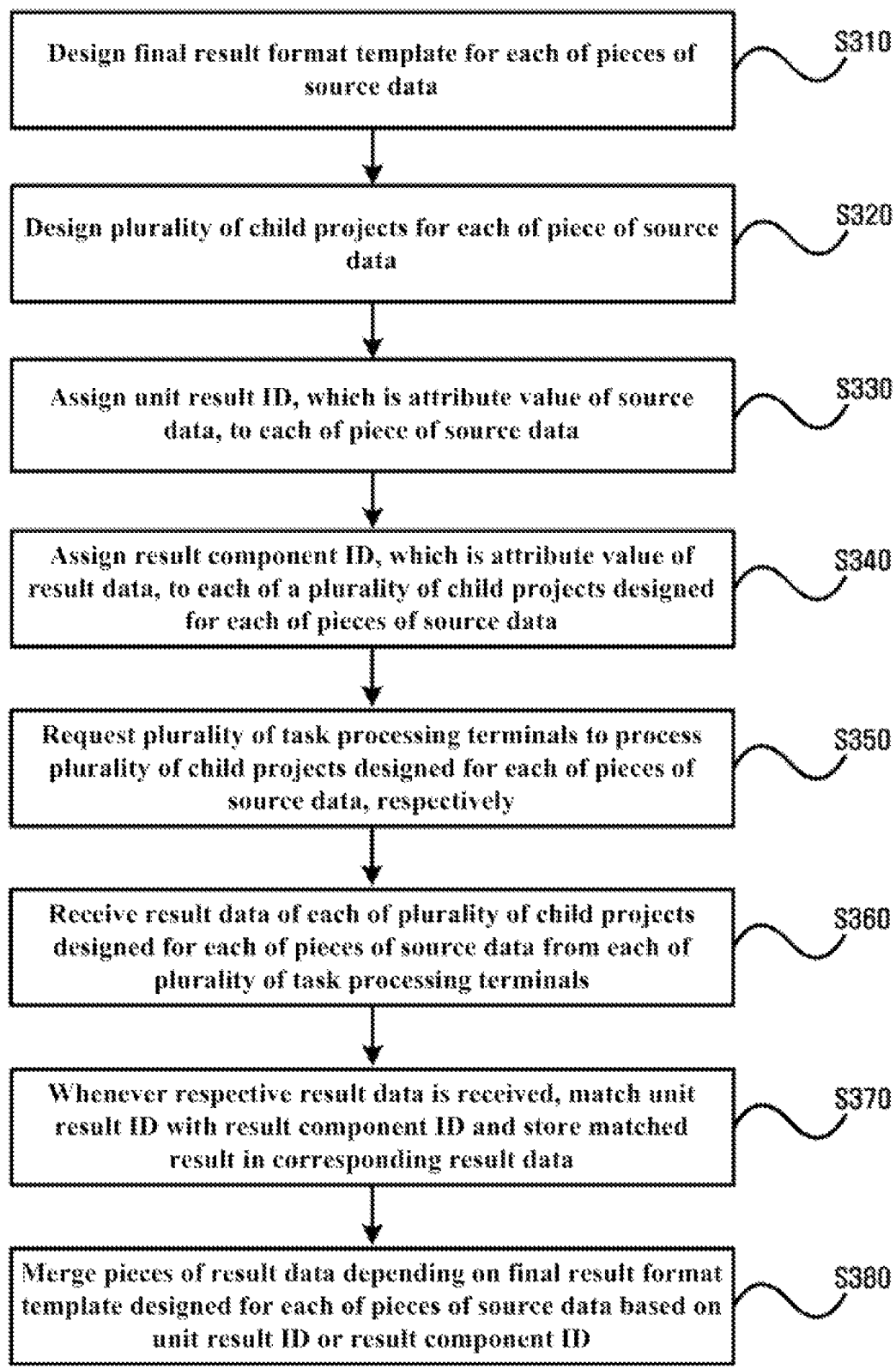
FIG. 22 is a flowchart of a project management method using data merging, according to an embodiment of the inventive concept.

FIG. 22 is a flowchart of a project management method using data merging, according to an embodiment of the inventive concept.

FIG. 23 is a diagram for describing a unit result ID and a result component ID, according to an embodiment of the inventive concept.

Figure 24:
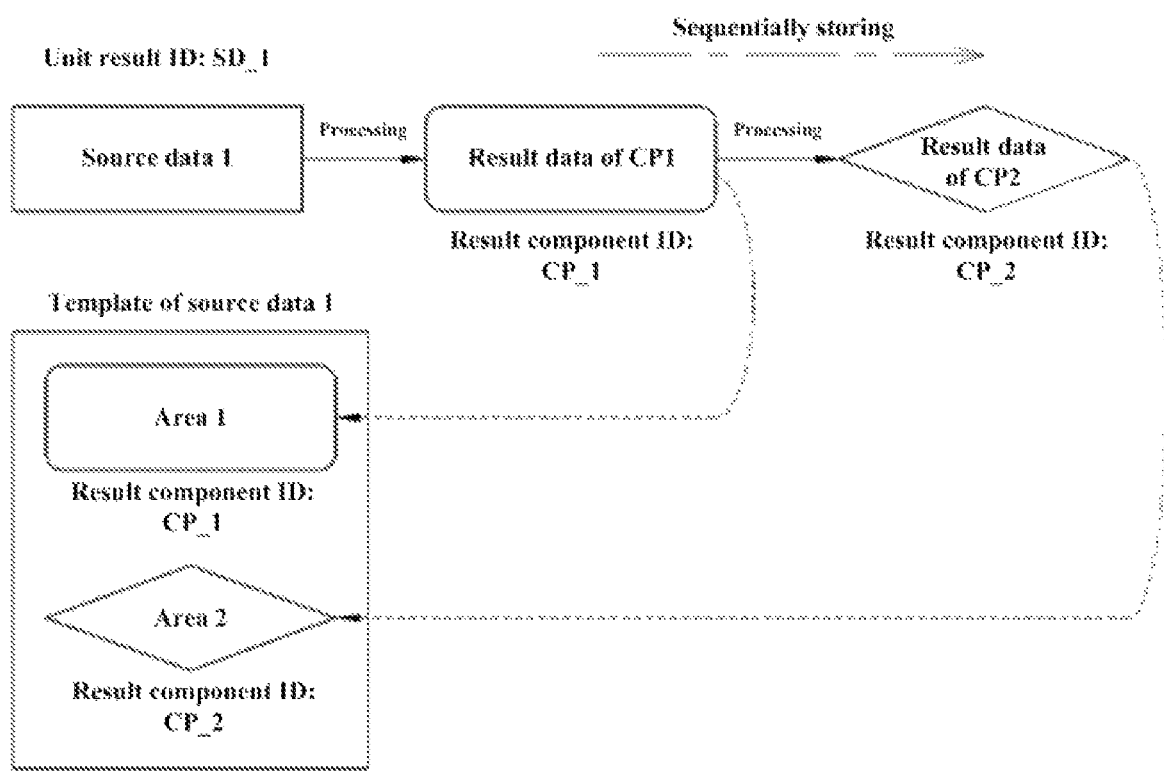
FIG. 24 is a diagram for describing merging of result data into a template when a plurality of child projects are connected in sequential order, according to an embodiment of the inventive concept.

FIG. 24 is a diagram for describing merging of result data into a template when a plurality of child projects are connected in sequential order, according to an embodiment of the inventive concept.

Figure 25:
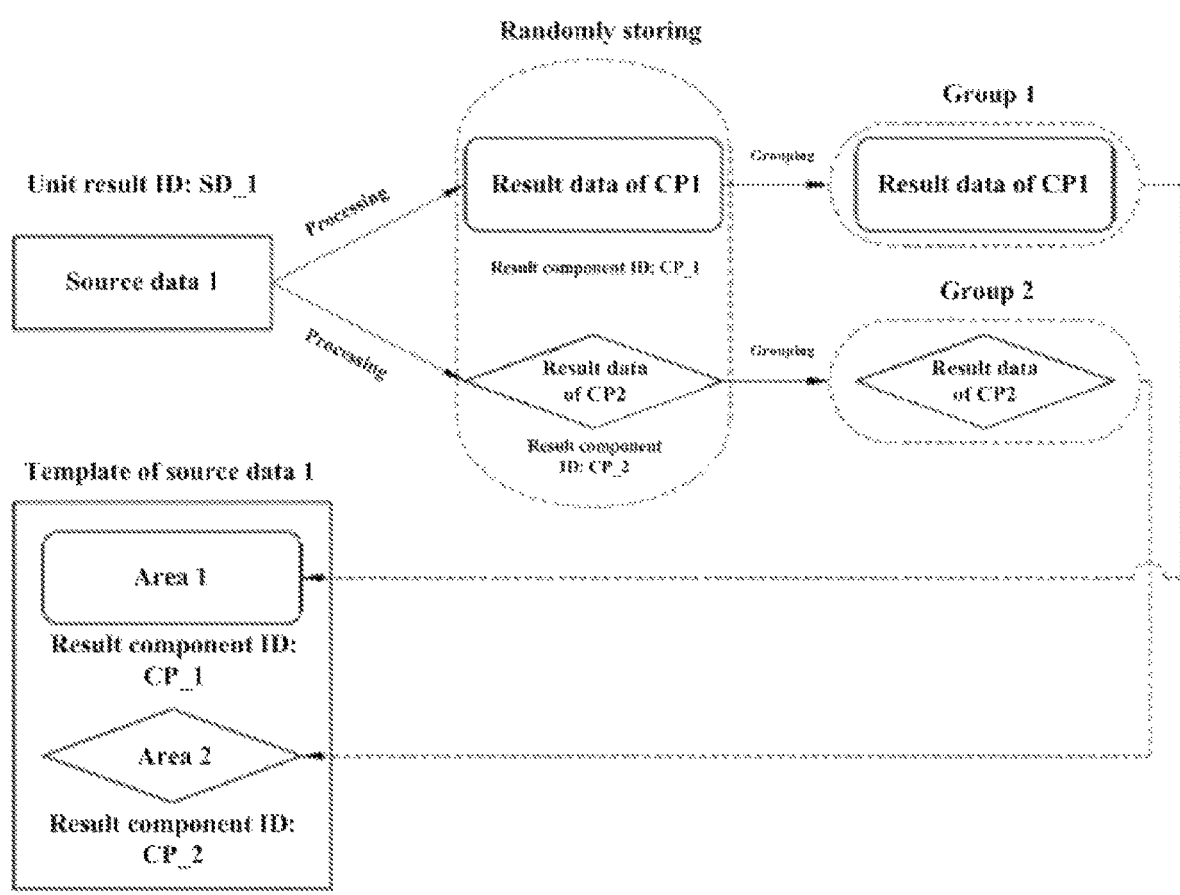
FIG. 25 is a diagram for describing merging of result data into a template when a plurality of child projects are not connected in sequential order, according to an embodiment of the inventive concept.

FIG. 25 is a diagram for describing merging of result data into a template when a plurality of child projects are not connected in sequential order, according to an embodiment of the inventive concept.

According to an embodiment of the inventive concept, the processor 160 of the device 100 may merge pieces of result data of a plurality of child projects divided based on a minimum unit task depending on a predetermined template such that a third process required for project management using data merge is automatically performed, and may provide a final result suitable for a format desired by a client.

Hereinafter, an operation of the processor 160 according to the third process will be described in detail.

Referring to FIG. 22, the template design unit 166 included in the processor 160 of the device 100 may design a final result format template for each of pieces of source data provided from the client server 200 (S310).

The template design unit 166 may design the final result format template for respective source data by determining a configuration of a result format of thousands or tens of thousands of source data thus requested.

In this case, the result format is one of initial negotiation requirements (task request information) provided from the client server 200. The template design unit 166 may define elements to be included in the final result before a child project is designed depending on the result format.

The final result format template designed for respective source data may include a plurality of areas (elements) to which pieces of result data for the corresponding source data are attached. In more detail, the final result format template designed for specific source data among the pieces of source data may include a plurality of areas, to each of which result data of each of a plurality of child projects designed for the specific source data is to be attached after operation S320.

In operation S310, the template design unit 166 may set the size and location for each of the plurality of areas included in the final result format template designed for specific source data and may assign the result component ID to each of the plurality of areas. That is, each of the elements defined depending on the result format may be set to have the location and size that need to be implemented in the format of the final result. A result component ID may be assigned as a unique identification value for each element.

Next, a child project design unit (not shown) included in the processor 160 of the device 100 may design a plurality of child projects for each of piece of source data (S320).

Operation S320 is the same as the descriptions described with reference to FIGS. 3 and 4, and thus a detailed description thereof will be omitted to avoid redundancy.

Here, each of the plurality of child projects includes one or more tasks, and may be divided depending on the type of a task included therein. The task may indicate a minimum unit task to be processed by the task processing terminal 300.

As described above, when an original project requested by the client server 200 includes 'N' source data ('N' original data) (here, 'N' is a natural number), and respective source data includes a bounding task and a tagging task, each of 'N' source data may be designed as two child projects. In other words, each of the 'N' source data may be divided into a first child project including a task related to the bounding task and a second child project including a task related to the tagging task. Accordingly, the first task processing terminal 300, which has been requested to process the first child project, may process only the bounding task. The first task processing terminal 300, which has been requested to process the second child project, may process only the tagging task.

Next, the data setting unit 167 included in the processor 160 of the device 100 may assign a unit result ID, which is an attribute value of source data, to each of the piece of source data (S330).

Next, the data setting unit 167 may assign a result component ID, which is an attribute value of result data, to each of a plurality of child projects designed for each of the pieces of source data (S340).

Referring to FIG. 23, when there are a total of 'N' source data (original data) requested from the client server 200, the data setting unit 167 may assign a unit result ID such as SD_1, SD_2, SD_3, . . . , and SD_N to each of the 'N' source data.

Moreover, when two child projects are designed for each of the 'N' source data, as illustrated in FIG. 23, result component IDs such as CP_1 and CP_2 may be assigned to the first child project and the second child project for respective source data, respectively. FIG. 23 illustrates that result component IDs assigned to the first child project and the second child project for respective source data are the same as each other. However, according to the embodiment, result component IDs such as CP_1_1, CP_1_2, CP_2_1, CP_2_2, . . . CP_N_1, and CP_N_2 may be assigned differently from one another. Furthermore, in FIG. 23, it is described that respective source data is identically designed as two child projects. However, according to the embodiment, respective source data may have the different number of designed child projects.

Next, the task processing request unit 161 included in the processor 160 of the device 100 may request the plurality of task processing terminals 300 to process a plurality of child projects designed for each of the pieces of source data, respectively (S350).

Next, the communication unit 120 of the device 100 may receive result data, which is a processing result of each of a plurality of child projects designed for each of the pieces of source data from each of the plurality of task processing terminals 300 (S360).

Operation S350 and operation S360 related to the reception of result data and a processing request for a child project are the same as described in operation S110, operation S120, operation S170, operation S210, operation S230, and operation S280, and thus a detailed description thereof will be omitted to avoid redundancy.

According to an embodiment, when the first child project and the second child project are designed for specific source data among the pieces of source data, the task processing request unit 161 may request the first task processing terminal 300 to process the first child project, and the communication unit 120 may receive first result data of a first child project from the first task processing terminal 300 in response to a request. Afterward, the task processing request unit 161 may request the second task processing terminal 300 to process the second child project, and the communication unit 120 may receive second result data of the second child project from the second task processing terminal 300.

As described above, the task processing request unit 161 may request the task processing terminal 300 to process a plurality of child projects designed for each of the entire 'N' source data, and the communication unit 120 may receive pieces of result data of a plurality of child projects for the 'N' source data from the task processing terminal 300.

Next, whenever respective result data is received, an ID matching unit (not shown) included in the processor 160 of the device 100 may match the unit result ID with the result component ID and may store the matched result in the corresponding result data (S370).

In detail, when respective result data is received, the unit result ID and result component ID assigned in advance to source data corresponding to the corresponding result data may be matched and stored.

When the first result data and the second result data for specific source data are stored, the unit result ID matched to the first result data may be the same as the unit result ID matched to the second result data, and the result component ID matched to the first result data may be different from the result component ID matched to the second result data.

For example, when the received result data is result data for the first child project of source data 3, the ID matching unit (not shown) may match the unit result ID to SD_3 for the corresponding result data and may match the result component ID to CP_1 (or CP_3_1).

Moreover, when result data received afterward is result data for the second child project of source data 3, the ID matching unit (not shown) may match the unit result ID to SD_3 for the corresponding result data and may match the result component ID to CP_2 (or CP_3_2).

Next, the data merging unit 168 included in the processor 160 of the device 100 may merge pieces of result data depending on a final result format template designed for each of the pieces of source data based on the unit result ID or the result component ID (S380).

According to an embodiment, when the first child project and the second child project have a sequential order, the data merging unit 168 may extract the first result data and the second result data, to which a unit result ID identical to the unit result ID for specific source data among the pieces of result data (all pieces of result data for each of the 'N' source data) is matched, and may merge the extracted first result data and second result data into a final result format template designed for the specific source data.

That is, when all source data is completely processed, result data, which has the same unit result ID, from among a lot of collected result data may be extracted. For example, only result data having the unit result ID of SD_1 may be extracted, and only result data having the unit result ID of SD_2 may be extracted. As such, only result data may be extracted for each unit result ID.

In this case, when the extracted first result data and the extracted second result data are merged into the final result format template designed for the specific source data, the first result data and the second result data may be merged into the first area and the second area included in the final result format template based on the order, respectively.

That is, because the first child project CP1 and the second child project CP2 designed for one source data are connected in sequential order, as described above, the first result data of the first child project CP1 and the second result data of the second child project CP2 for the corresponding source data are sequentially stored.

Accordingly, as shown in FIG. 24, even when grouping is not performed by using a result component ID, it is possible to identify respective result data of a child project depending on the corresponding order. Accordingly, according to the connection order of a plurality of child projects, the data merging unit 168 may merge the first result data of the first child project CP1 into area 1, to which the result component ID of CP_1 is assigned in the template of source data 1 and may merge the second result data of the second child project of CP2 into area 2, to which the result component ID CP_2 is assigned in the template of source data 1.

According to another embodiment, when the first child project and the second child project do not have a sequential order, the data merging unit 168 may extract the first result data and the second result data, to which the same unit result ID as the unit result ID for the specific source data is matched, from among the pieces of result data (all pieces of result data for each of the 'N' source data), may group the first result data matched with the first result component ID into a first group, may group the second result data matched with the second result component ID into a second group, and may merge the first group and the second group into a final result format template designed for the specific source data.

In this case, when the first group and the second group are merged into the final result format template designed for the specific source data, in the case where the first result component ID is assigned to a first area included in the final result format template and the second result component ID is assigned to a second area included in the final result format template, the data merging unit 168 may merge the first group into the first area and may merge the second group into the second area.

That is, because the first child project CP1 and the second child project CP2 designed for one source data are not connected in sequential order, the first result data of the first child project CP1 and the second result data of the second child project CP2 for the corresponding source data are randomly stored.

Accordingly, as shown in FIG. 25, first of all, pieces of result data for the same source data may be first extracted by using a unit result ID, and pieces of result data may be grouped for each result component ID by using the result component ID assigned to the extracted result data. The result data of the first child project CP1 grouped into group 1 may be merged in area 1 to which the result component ID of CP_1 is assigned in the template. The result data of the second child project CP2 grouped into group 2 may be merged into area 2 to which the result component ID of CP_2 is assigned in the template.

When pieces of result data of the first child project CP1 or pieces of result data of the second child project CP2 are present, the pieces of result data may be grouped for each result component ID and then the groups may be efficiently merged into a template.

As described above, according to another embodiment of the inventive concept, regardless of the complexity of a connection between a plurality of child projects and the minimum number of unit tasks, task result data may be configured depending on the desired final result format. Besides, unlike a conventional method in which a configuration of result data is determined depending on a screen element design, because all pieces of result data are merged at an appropriate location depending on the template format after all tasks are completed, it is possible to arbitrarily design result data independently of a task screen element design.

Hereinafter, according to an embodiment of the inventive concept, an error processing method for a previous child project among a plurality of child projects by setting a cost payment time point will be described with reference to FIGS. 26 to 30.

Figure 26:
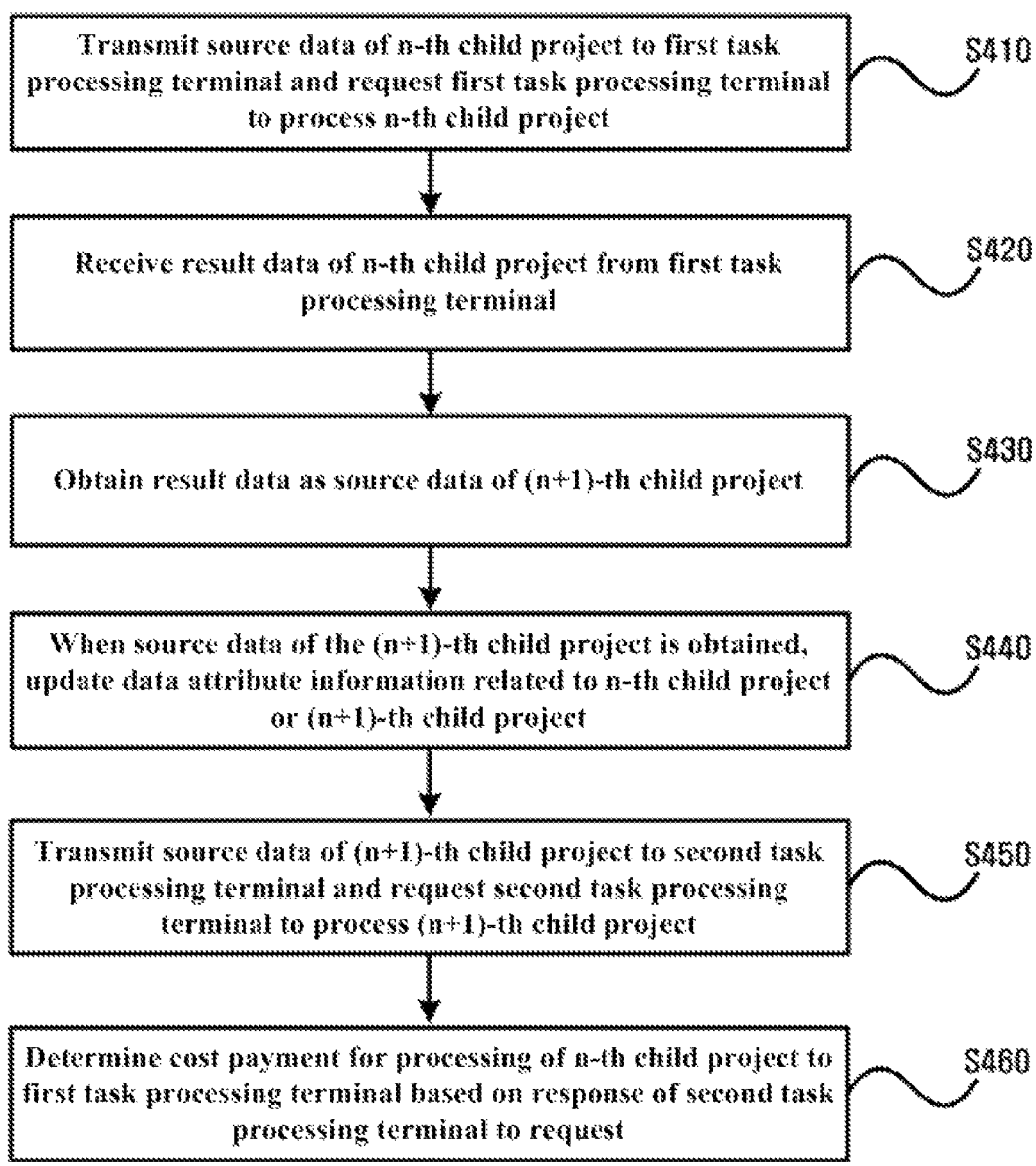
FIG. 26 is a flowchart of a project management method using a cost payment time point setting, according to an embodiment of the inventive concept.

FIG. 26 is a flowchart of a project management method using a cost payment time point setting, according to an embodiment of the inventive concept.

Figure 27:
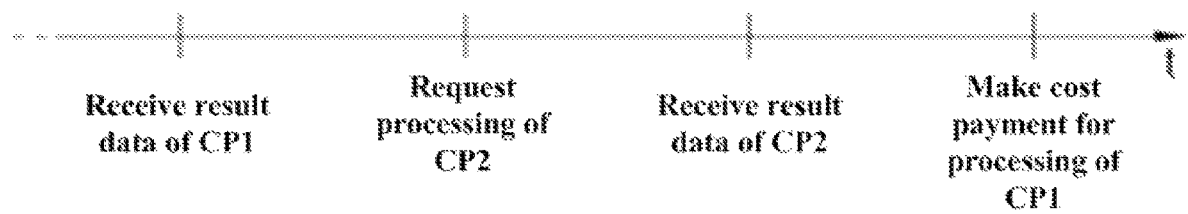
FIG. 27 is a diagram for describing a cost payment for processing of a next child project, according to an embodiment of the inventive concept.

FIG. 27 is a diagram for describing a cost payment for processing of a next child project, according to an embodiment of the inventive concept.

Figure 28:
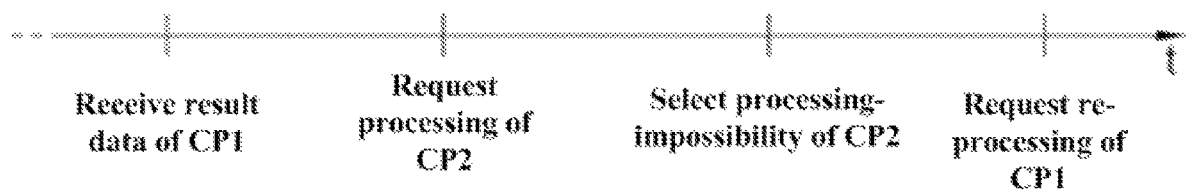
FIG. 28 is a diagram for describing re-processing of a previous child project, according to an embodiment of the inventive concept.

FIG. 28 is a diagram for describing re-processing of a previous child project, according to an embodiment of the inventive concept.

Figure 29:
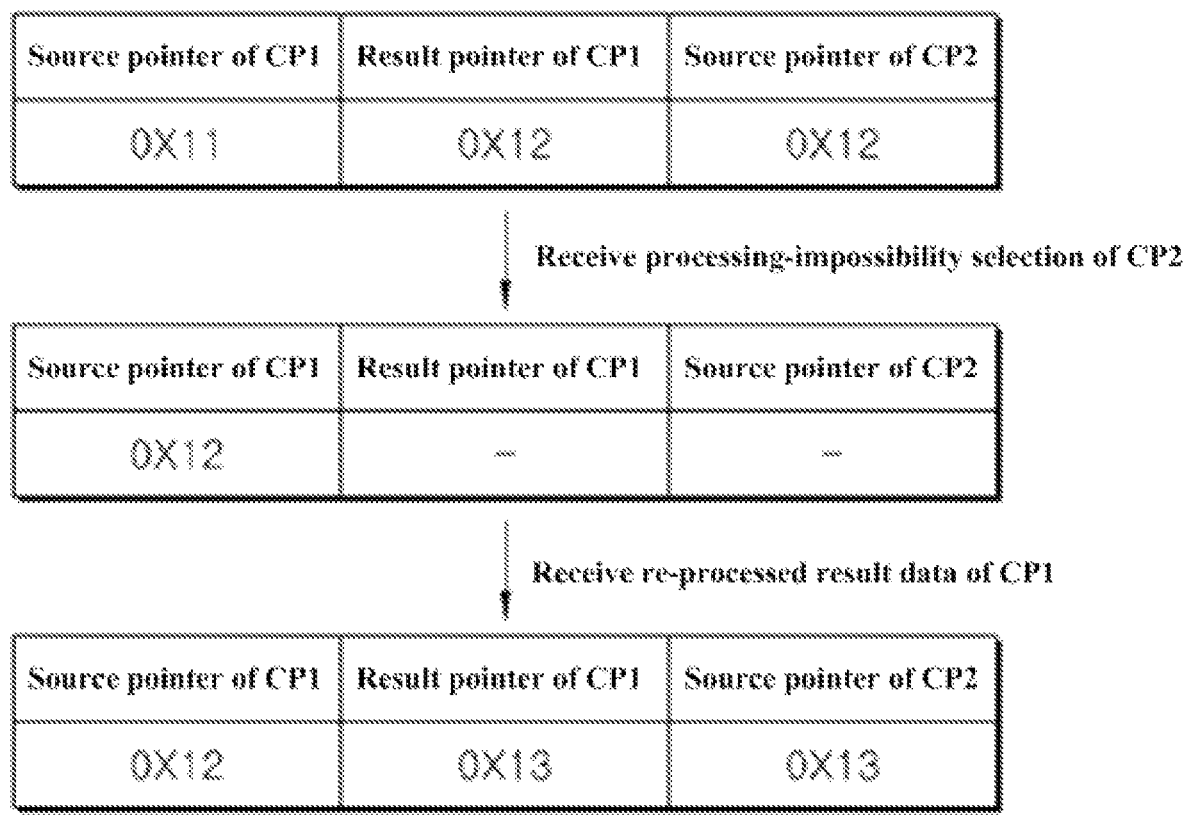
FIG. 29 is a diagram for describing pointer-related data attribute information changed when a processing-impossibility selection is received or re-processed result data is received, according to an embodiment of the inventive concept.

FIG. 29 is a diagram for describing pointer-related data attribute information changed when a processing-impossibility selection is received or re-processed result data is received, according to an embodiment of the inventive concept.

Figure 30:
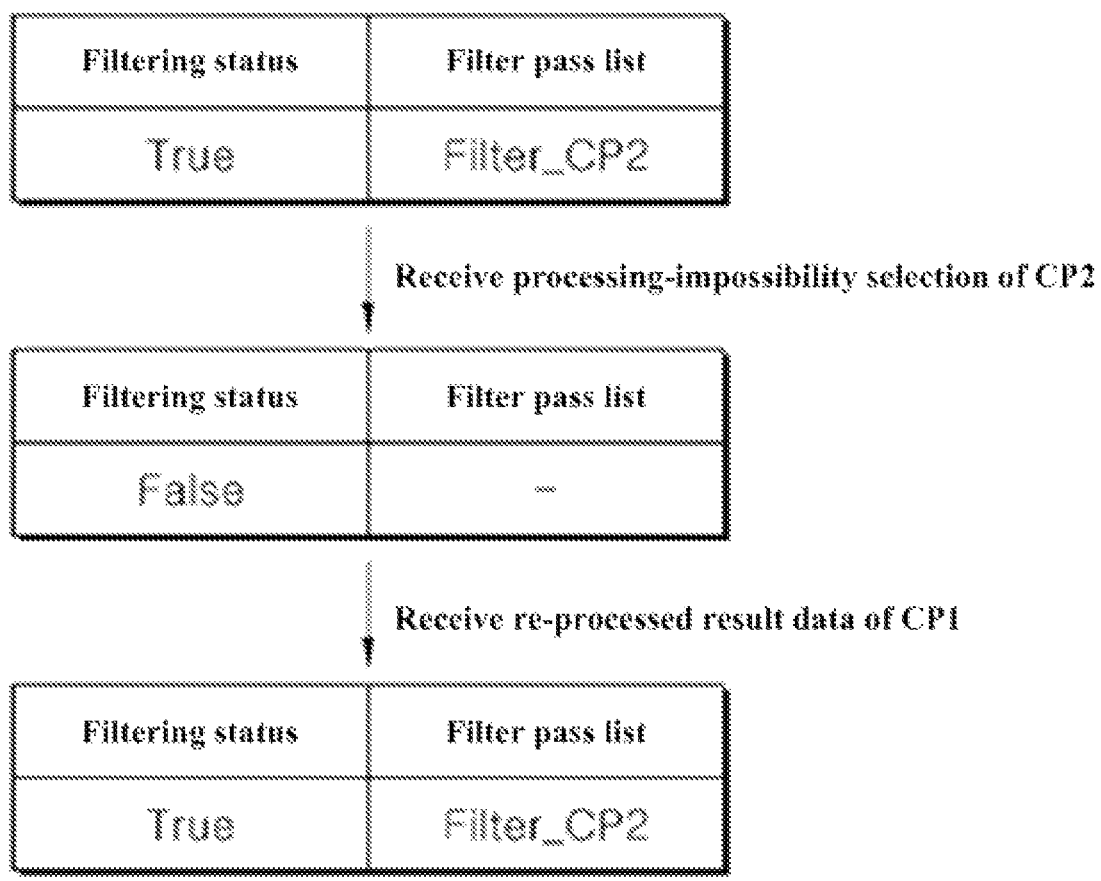
FIG. 30 is a diagram for describing filtering-related data attribute information changed when a processing-impossibility selection is received or re-processed result data is received, according to an embodiment of the inventive concept.

FIG. 30 is a diagram for describing filtering-related data attribute information changed when a processing-impossibility selection is received or re-processed result data is received, according to an embodiment of the inventive concept.

According to an embodiment of the inventive concept, the processor 160 of the device 100 may determine whether to pay a cost for processing a previous child project depending on whether an error occurs in the processing result of a previous child project in a next child project among a plurality of child projects that are classified based on a minimum unit task and connected in sequential order, by automatically performing a fourth process required for project management using the setting of a cost payment time point.

Hereinafter, an operation of the processor 160 according to the fourth process will be described in detail.

Referring to FIG. 26, the task processing request unit 161 included in the processor 160 of the device 100 may transmit source data of an n-th child project to a first task processing terminal among a plurality of child projects connected in sequential order and then may request the first task processing terminal to process the n-th child project (S410).

Next, the communication unit 120 of the device 100 may receive result data, which is the processing result of the n-th child project, from the first task processing terminal in response to a request (S420).

Operation S410 and operation S420 related to the reception of result data and a processing request for a child project are the same as described in operation S110, operation S120, operation S210, and operation S230, and thus a detailed description thereof will be omitted to avoid redundancy.

Next, the task target data identification unit 164 included in the processor 160 of the device 100 may obtain the result data as source data of an (n+1)-th child project among the plurality of child projects (S430).

In detail, the task target data identification unit 164 may obtain the result data of the n-th child project as source data of the (n+1)-th child project by using at least one of a data pointer and data filtering.

A description of a method of obtaining the result data of the n-th child project as the source data of the (n+1)-th child project by using the data pointer that is the same as described with reference to FIGS. 7 to 14, and thus a detailed description thereof will be omitted to avoid redundancy.

A description of a method of obtaining the result data of the n-th child project as the source data of the (n+1)-th child project by using the data filtering that is the same as described with reference to FIGS. 8 to 21, and thus a detailed description thereof will be omitted to avoid redundancy.

Next, when the source data of the (n+1)-th child project is obtained, the data attribute information management unit 163 included in the processor 160 of the device 100 may update data attribute information related to the n-th child project or the (n+1)-th child project (S440).

According to an embodiment, when obtaining the source data by using the data pointer, the data attribute information management unit 163 may update pointer-related data attribute information. In this case, the pointer-related data attribute information may include a result pointer value of the n-th child project and a source pointer value of the (n+1)-th child project.

In detail, as described above, when the result data of the first child project CP1 is obtained as the source data of the second child project CP2 by using the data pointer, the result pointer of the first child project CP1 of source data 1 and the source pointer of the second child project CP2 of source data 1 may be updated to indicate the same address value (e.g., 0X11).

According to another embodiment, when obtaining the source data by using the data filtering, the data attribute information management unit 163 may update filtering-related data attribute information. In this case, the filtering-related data attribute information may include a filtering status of the n-th child project and a filter pass list.

In detail, as described above, when the result data of the first child project CP1 is obtained as the source data of the second child project CP2 by using the data filtering, the filtering status of the first child project CP1 of source data 1 may have a true value, and the filter pass list may be updated to include a filter ID related to the second child project CP2.

Next, the task processing request unit 161 may transmit source data of the (n+1)-th child project to the second task processing terminal and then may request the second task processing terminal to process the (n+1)-th child project (S450).

Operation S410 and operation S450 related to the reception of result data and a processing request for a child project are the same as described in operation S170 and operation S280, and thus a detailed description thereof will be omitted to avoid redundancy.

Next, the error management unit 169 included in the processor 160 of the device 100 may determine a cost payment for the processing of the n-th child project to the first task processing terminal 300 based on a response of the second task processing terminal to a request (S460).

According to an embodiment, when receiving the result data that is the processing result of the (n+1)-th child project from the second task processing terminal 300, the error management unit 169 may determine the cost payment for the processing of the n-th child project to the first task processing terminal.

That is, referring to FIG. 27, the cost payment for the processing of the first child project CP1 is made after the result data of the second child project CP2 is received. The first child project CP1 and the second child project CP2 are connected in sequential order. When the cost payment for the first child project is made before the processing of the second child project CP2 is completed, it is difficult to get a refund on the cost already paid even when an error occurs in the result data of the first child project CP1 later. Accordingly, the cost payment for the first child project CP1 needs to be made after the processing of the second child project CP2 is completed.

In more detail, the cost payment time point for the processing of the n-th child project may be set in advance as a time point at which data attribute information related to the (n+1)-th child project is updated from a value indicating that the processing for the (n+1)-th child project is in progress, to a value indicating "completion". Accordingly, when the processing status among the data attribute information related to the (n+1)-th child project is updated to a value indicating "completion", the error management unit 169 may identify the processing status, and may request a cost payment unit (not shown) to make a cost payment for processing the first child project CP1 to the first task processing terminal 300.

According to another embodiment, the error management unit 169 may receive a processing-impossibility selection for the (n+1)-th child project from the second task processing terminal 300 and may request the first task processing terminal 300 to re-process the n-th child project instead of a cost payment for the processing of the n-th child project.

That is, referring to FIG. 28, when the processing-impossibility for the second child project CP2 is selected from the second task processing terminal 300, the task processing request unit 161 may request the first task processing terminal 300 to re-process the first child project CP1.

A handler who receives a processing request for the second child project CP2 may execute a task included in the second child project CP2 through the second task processing terminal 300. In the case, when it is determined that the processing of the task is impossible, the handler may select a processing-impossibility button, or the like through the second task processing terminal 300.

As described above, the source data of the second child project CP2 provided to the second task processing terminal 300 is data in which the processing result for the first child project CP1 is displayed. The first child project CP1 is a task related to a bounding task. When a processing result related to the bounding task is not displayed on source data provided to the second task processing terminal 300, the handler may select the processing-impossibility for the corresponding source data.

When the re-processing for the first child project CP1 is requested, related data attribute information may be changed.

For example, when source data is obtained by using a data pointer in response to a re-processing request, the error management unit 169 may request the data attribute information management unit 163 to change a source pointer value of the n-th child project included in pointer-related data attribute information to a result pointer value of the n-th child project. Moreover, the task processing request unit 161 may transmit result data of the n-th child project stored at a location indicated by the changed source pointer value to the first task processing terminal 300 and may request the first task processing terminal 300 to re-process the n-th child project.

Referring to FIG. 29, when the processing-impossibility selection for the second child project CP2 is received, the value of the source pointer of the first child project may be changed from "0X11" to "0X12" so as to be the same as the value of the result pointer of the first child project. Accordingly, source data of the first child project CP1 provided to the first task processing terminal 300 in response to a re-processing request may be result data of the first child project CP1 that has been previously executed. That is, the handler of the first task processing terminal 300 may identify result data of the previous task and may correct the wrong part.

Afterward, when the re-processed result data of the first child project CP1 is received from the first task processing terminal 300, new location information about the re-processed result data is generated (i.e., it is stored at a different location in the memory 140), the same address value (0X13) is recorded at the result pointer of the first child project CP1 and the source pointer of the second child project CP2.

For another example, when source data is obtained by using data filtering in response to the re-processing request, the filtering status of the n-th child project included in the filtering-related data attribute information may be changed from a true value to a false value, and a filter ID related to the (n+1)-th child project may be excluded from the filter pass list.

Referring to FIG. 30, when the processing-impossibility selection for the second child project CP2 is received, the filtering status value of the first child project may be changed from "True" to "False", and a filter ID Filter_CP2 related to the second child project may be excluded from the filter pass list.

Afterward, when the re-processed result data of the first child project CP1 is received from the first task processing terminal 300, the filtering status value for the re-processed result data may be changed from "False" to "True", and the filter pass list may again include the filter ID Filter_CP2 related to the second child project.

Also, according to an embodiment of the inventive concept, the data attribute information may be updated as the plurality of child projects are processed depending on the order.

The data attribute information may be updated as the plurality of child projects are processed in the order in which the plurality of child projects are sequentially connected. That is, the data attribute information such as a progress status of each of a plurality of child projects, a source pointer, and a result pointer, a final unit task ID, a processing status, a filtering status, a filter pass list, or the like may be updated in real time as the plurality of child projects are processed. The descriptions thereof the same as described above and thus detailed description thereof will be omitted to avoid redundancy.

In the meantime, the method of the inventive concept may further include transmitting result data re-processed by the first task processing terminal 300 to the second task processing terminal 300 that has selected processing-impossibility and requesting the second task processing terminal 300 to process the (n+1)-th child project again. That is, as described above, metadata is managed for respective source data, and thus the second task processing terminal 300 to which the (n+1)-th child project was previously assigned may be identified. Accordingly, the same handler may be in charge of processing the same child project by providing result data of the re-processing of the n-th child project to the same second task processing terminal 300 that had previously selected processing-impossibility for the n-th child project.

It is described throughout the specification that only the task is performed by the task processing terminal 300 for each child project. However, each child project is executed by the task processing terminal 300. Afterward, it may be understood that an inspection process is performed by the task management terminal 400 for the corresponding result data when the corresponding result data is received.

Various embodiments of the inventive concept described with reference to FIGS. 1 to 26 are not limited to the referenced drawings and descriptions thereof, and the embodiments of the inventive concept may be combined and applied in various ways or forms with each other.

In the meantime, in the above description about each of the embodiments, operation S110 to operation S460 may be further divided into additional operations or may be combined into fewer operations, according to an embodiment of the inventive concept. In addition, some operations may be omitted as necessary, and the order between operations may be changed.

According to an embodiment of the inventive concept, a unit task management method of crowdsourcing-based project may be implemented by a program (or an application) and may be stored in a medium such that the program is executed in combination with a server being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, a project may be efficiently operated by dividing a project based on a minimum unit task and designing a plurality of child projects connected in sequential order such that a plurality of child projects proceed in order.

Through real-time parallel processes such as task allocation, task execution, inspection allocation, and inspection execution based on the minimum unit task for respective source data, the productivity of the project may be increased, the total required time of the project may be shortened, and the utilization of human resources may be improved.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A project management method, which is performed by a project management device connected with task processing terminals via a network, the method comprising:
    transmitting, via the network, source data of an n-th child project among a plurality of child projects connected in sequential order to a first task processing terminal, and requesting, via the network, the first task processing terminal to process the n-th child project, wherein 'n' is a natural number;
    receiving, via the network, result data that is a processing result of the n-th child project from the first task processing terminal, in response to the request;
    storing the result data of the n-th child project at a specific location in a hardware memory, and generating location information including an address value of the specific location;
    recording the location information at a result pointer of the n-th child project by changing a value of the result pointer of the n-th child project from a garbage value or null value to an address value corresponding to the location information;
    recording the location information at a source pointer of an (n+1)-th child project among a plurality of child projects by changing a value of the source pointer of the (n+1)-th child project from another garbage value or null value to the address value corresponding to the location information;
    automatically obtaining the result data of the n-th child project, stored at the location indicated by the source pointer as source data of the (n+1)-th child project among the plurality of child projects, by using the result pointer of the n-th child project and the source pointer the (n+1)-th child project, which have the same location information;
    transmitting, via the network, the source data of the (n+1)-th child project to a second task processing terminal, and requesting, via the network, the second task processing terminal to process the (n+1)-th child project, wherein each of the plurality of child projects includes one or more tasks, and is divided depending on a type of a task included in each of the plurality of child projects, wherein each of the tasks indicates a minimum unit task to be processed by a task processing terminal, wherein, when the (n+1)-th child project is connected in parallel to a (n+2)-th child project among the plurality of child projects, the result data of the n-th child project is used as the source data of the (n+1)-th child project and source data of the (n+2)-th child project, wherein the source pointer of the (n+1)-th child project and a source pointer of the (n+2)-th child project indicate one address in the memory, and wherein the one address in the memory corresponds to the location information at which the result data of the n-th child project is stored; and processing a cost payment for processing of the n-th child project to the first task processing terminal is after result data of the (n+1)-th child project is received from the second task processing terminal by the project management device; and when the project management device receives a processing-impossibility selection for the (n+1)-th child project from the second task processing terminal, requesting, by the project management device, the first task processing terminal to re-process the n-th child project instead of the cost payment for the processing of the n-th child project.

2. The method of claim 1, wherein, when the n-th child project includes a plurality of tasks, the generating of the location information includes:

generating one location information by storing result data for each of the plurality of tasks at a same location in the memory.

3. The method of claim 1, wherein, when the (n+1)-th child project is connected in parallel to the (n+2)-th child project among the plurality of child projects, result data of the (n+1)-th child project and result data of the (n+2)-th child project are used as source data of a (n+3)-th child project among the plurality of child projects.

4. The method of claim 3, wherein a source pointer of the (n+3)-th child project is implemented with multiple pointers indicating two different addresses in the memory, and wherein the two different addresses in the memory correspond to location information where the result data of the (n+1)-th child project is stored and location information where the result data of the (n+2)-th child project is stored, respectively.

5. The method of claim 1, further comprising:

updating data attribute information as the plurality of child projects are processed depending on the order.

6. The method of claim 1, wherein, when the 'n' is two or more, the source data of the n-th child project is result data of a (n−1)-th child project among the plurality of child projects, and wherein, when 'n' is 1, the source data of the n-th child project is original data that is previously set up.

7. A computer-readable recording medium storing a program combined with a computer being a piece of hardware to execute a method in claim 1.

8. A project management device using a data pointer, the project management device comprising:

a communication unit configured to communicate with task processing terminals via a network;

a memory including at least one process necessary for project management using the data pointer; and a processor operating depending on the process, wherein the processor is configured, based on the process, to:

transmit, via the network, source data of an n-th child project among a plurality of child projects connected in sequential order to a first task processing terminal, and request, via the network, the first task processing terminal to process the n-th child project, wherein 'n' is a natural number;

receive, via the network, result data that is a processing result of the n-th child project from the first task processing terminal, in response to the request;

store the result data of the n-th child project at a specific location in the memory, and generate location information including an address value of the specific location;

record the location information at a result pointer of the n-th child project by changing a value of the result pointer of the n-th child project from a garbage value or null value to an address value corresponding to the location information;

record the location information at a source pointer of an (n+1)-th child project among a plurality of child projects by changing a value of the source pointer of the (n+1)-th child project from another garbage value or null value to the address value corresponding to the location information;

automatically obtain the result data of the n-th child project, stored at the location indicated by the source pointer as source data of the (n+1)-th child project among the plurality of child projects, by using the result pointer of the n-th child project and the source pointer the (n+1)-th child project, which have the same location information;

transmit, via the network, the source data of the (n+1)-th child project to a second task processing terminal, and request, via the network, the second task processing terminal to process the (n+1)-th child project, wherein each of the plurality of child projects includes one or more tasks, and is divided depending on a type of a task included in each of the plurality of child projects, wherein each of the tasks indicates a minimum unit task to be processed by a task processing terminal, wherein, when the (n+1)-th child project is connected in parallel to a (n+2)-th child project among the plurality of child projects, the result data of the n-th child project is used as the source data of the (n+1)-th child project and source data of the (n+2)-th child project, wherein the source pointer of the (n+1)-th child project and a source pointer of the (n+2)-th child project indicate one address in the memory, and wherein the one address in the memory corresponds to the location information at which the result data of the n-th child project is stored; and process a cost payment for processing of the n-th child project to the first task processing terminal is after result data of the (n+1)-th child project is received from the second task processing terminal; and when a processing-impossibility selection for the (n+1)-th child project is received from the second task processing terminal, request the first task processing terminal to re-process the n-th child project instead of the cost payment for the processing of the n-th child project.

9. The project management device of claim 8, wherein, when the n-th child project includes a plurality of tasks, the processor generates one location information by storing result data for each of the plurality of tasks at a same location in the memory, when generating the location information.

10. The project management device of claim 8, wherein, when the (n+1)-th child project is connected in parallel to the (n+2)-th child project among the plurality of child projects, result data of the (n+1)-th child project and result data of the (n+2)-th child project are used as source data of a (n+3)-th child project among the plurality of child projects.

11. The project management device of claim 10, wherein a source pointer of the (n+3)-th child project is implemented with multiple pointers indicating two different addresses in the memory, and
   wherein the two different addresses in the memory correspond to location information where the result data of the (n+1)-th child project is stored and location information where the result data of the (n+2)-th child project is stored, respectively.

12. The project management device of claim 8, wherein the processor updates data attribute information as the plurality of child projects are processed depending on the order.

13. The project management device of claim 8, wherein, when the 'n' is two or more, the source data of the n-th child project is result data of a (n−1)-th child project among the plurality of child projects, and
   wherein, when 'n' is 1, the source data of the n-th child project is original data that is previously set up.

\* \* \* \* \*